United States Patent [19]
Gschneidner, Jr. et al.

[11] Patent Number: 5,435,137
[45] Date of Patent: Jul. 25, 1995

[54] TERNARY DY-ER-AL MAGNETIC REFRIGERANTS

[75] Inventors: Karl A. Gschneidner, Jr., Ames, Iowa; Hiroyuki Takeya, Ibaraki, Japan

[73] Assignee: Iowa State University Research Foundation, Inc., Ames, Iowa

[21] Appl. No.: 88,882

[22] Filed: Jul. 8, 1993

[51] Int. Cl.6 .............................................. F25B 21/00
[52] U.S. Cl. .......................................... 62/3.1; 62/6; 148/301; 148/304; 420/416
[58] Field of Search ....................... 62/3.1, 6; 148/301, 148/304; 420/416

[56] References Cited

U.S. PATENT DOCUMENTS

| | | | |
|---|---|---|---|
| 4,107,935 | 8/1978 | Steyert, Jr. | 62/3.1 |
| 4,332,135 | 6/1982 | Barclay | 62/3.1 |
| 4,459,811 | 7/1984 | Barclay | 62/3.1 |
| 4,507,927 | 4/1985 | Barclay | 62/3.1 |
| 4,829,770 | 5/1989 | Hashimoto | 62/3.1 |
| 4,849,017 | 7/1989 | Sahashi et al. | 148/301 X |
| 5,060,478 | 10/1991 | Fukamichi | 62/3.1 |
| 5,186,765 | 2/1993 | Arai et al. | 62/3.1 X |
| 5,213,630 | 5/1993 | Hashimoto | 148/301 |
| 5,249,424 | 10/1993 | DeGegoria et al. | 62/3.1 |

OTHER PUBLICATIONS

"Materials for Regenerative Magnetic Cooling Spanning 20K to 80K"; Adv. Cryogenic Eng. 37, 1992, pp. 883–890; Zimm, Ludeman, Severson, Henning.
"Heat Capacity in Superconducting and Normal-State $LaS_x$ ($1.333 \leq x \leq 1.500$) Compounds"; Phys. Review B, vol. 25, No. 7, Apr. 1, 1982, pp. 4604–4617; Ikeda, Gschneidner, Jr., Beaudry, Atzmony.
"Comptes Rendus Herbdomadaires Des Séances" De L'académie Des Sciences, 247, pp. 1836–1838 (1958).
"Thermodynamic Analysis of Magnetically Active Regenerator From 30 to 70K with a Brayton–like Cycle"; Cryogenics, 1990, vol. 30, Oct., pp. 840–845; Matsumoto, Hashimoto.
"An Ericsson Magnetic Refrigerator For Low Temperature"; Adv. in Cryo. Eng., vol. 33, pp. 743–450; Matsumoto, Ito, Hashimoto.
"Investigations on the Possibility of the $RAl_2$ System as a Refrigerant in an Ericsson Type Magnetic Refrigerator"; pp. 279–286; Hashimoto, et al.
"Binary Alloy Phase Diagrams", 2nd Edition, vol. 1, (1990), pp. 144–145.
"Investigation of the Magnetic Refrigerant for the Ericsson Magnetic Refrigerator"; Jap. J. App. Phy., vol. 26 (1987), pp. 1673–1674; Hashimoto, et al.
"New Application of Complex Magnetic Materials to the Magnetic Refrigerant in an Ericsson Magnetic Refrigerator"; J. Appl. Phys. 62(9), Nov. 1, 1987, pp. 3873–3878; Hashimoto, et al.

Primary Examiner—Christopher Kilner
Attorney, Agent, or Firm—Edward J. Timmer

[57] ABSTRACT

A ternary magnetic refrigerant material comprising $(Dy_{1-x}Er_x)Al_2$ for a magnetic refrigerator using the Joule-Brayton thermodynamic cycle spanning a temperature range from about 60K to about 10K, which can be adjusted by changing the Dy to Er ratio of the refrigerant.

6 Claims, 27 Drawing Sheets

REVERSED BRAYTON CYCLE

ENTROPY OF $(Dy_{0.5}Er_{0.5})Al_2$ FROM 0 TO 70K AT FIVE DIFFERENT FIELDS.

REVERSED BRAYTON CYCLE

REVERSED BRAYTON CYCLE $(Dy_{0.5}Er_{0.5})Al_2$: AS-CAST, 80X

HEAT CAPACITY OF $(Dy_{0.5}Er_{0.5})Al_2$ FROM ~2K TO 70K AT FIVE DIFFERENT MAGNETIC FIELDS

THE C/T VS. T PLOT FOR $(Dy_{0.5}Er_{0.5})Al_2$ AS A FUNCTION OF TEMPERATURE FROM ~1.5 TO 70K AT FIVE MAGNETIC FIELDS

ENTROPY OF $(Dy_{0.5}Er_{0.5})Al_2$ FROM 0 TO 70K AT FIVE DIFFERENT FIELDS.

THE CALCULATED MAGNETOCALORIC EFFECT FOR FOUR DIFFERENT MAGNETIC FIELD CHANGES AS A FUNCTION OF TEMPERATURE FOR $(Dy_{0.5}Er_{0.5})Al_2$.

TERNARY DY-ER-AL MAGNETIC REFRIGERANTS

CONTRACTUAL ORIGIN OF INVENTION

The United States Government has rights in this invention pursuant to Contract No. W-7405-ENG-82 between the U.S. Department of Energy and Iowa State University, Ames, Iowa, which contract grants to the Iowa State University Research Foundation, Inc. the right to apply for this patent.

FIELD OF THE INVENTION

The present invention relates to magnetic refrigeration and, more particularly, to an active magnetic regenerative refrigeration device using the Joule-Brayton thermodynamic cycle for the liquefaction of hydrogen and/or hydrogen slush (a mixture of solid and liquid hydrogen) and to magnetic refrigerants comprising aluminum base intermetallic alloys.

BACKGROUND OF THE INVENTION

Magnetic refrigeration is being considered as an alternative technique to gas compressor technology for cooling and heating based on engineering and economic considerations that indicate that magnetic regenerator refrigerators, in principle, using currently known and available magnetic materials are more efficient than gas cycle refrigerators and thus can yield savings in the cost of operation and conservation of energy.

In the use of magnetic regenerator refrigeration of liquefaction of hydrogen gas, the conventional magnetic refrigerant employed to-date comprises a GdPd alloy. This magnetic refrigerant is disadvantageous from a cost standpoint in that 50% of the alloy comprises expensive Pd metal. A second disadvantage is that the GdPd alloy is somewhat ductile and thus is difficult to crush into fine particles (or powder) which are necessary for efficient heat transfer during the refrigeration cycle. Moreover, although the GdPd alloy exhibits useful magnetic entropy, there are several other heavy lanthanides (e.g. Tb, Dy, Ho, and Er) that exhibit magnetic entropy values approximately 35% larger than that of Gd and thus theoretically offer improved properties for magnetic refrigeration, provided all of the magnetic entropy is associated with the ferromagnetic ordering process on which magnetic refrigeration is based. Magnetic materials including Tb, Dy, Ho, and Er appear to have been neglected as candidate magnetic refrigerant materials as a result of the belief that an appreciable fraction of the magnetic entropy of these materials is associated with crystalline electric field effects, not ferromagnetic ordering, and thus would be less than the magnetic entropy attributed to ferromagnetic ordering observed in Gd in which there are no crystal field effects. Moreover, materials containing Tb, Dy, Ho, and Er exhibit a disadvantageously lower ferromagnetic ordering temperature than the GdPd alloy.

U.S. Pat. No. 4,829,770 describes an attempt to provide a magnetic refrigerant material exhibiting magneto-thermal properties for a magnetic regenerator refrigerator based on the Ericsson thermodynamic cycle. In particular, the patent describes a complex magnetic refrigerant that must include at least three distinct magnetic aluminide compounds in powdered or sintered admixture or in a multi-layered arrangement. The magnetic compounds are selected from aluminides of Gd, Tb, Dy, Ho and Er. The magnetic refrigerant mixture or multi-layer described in the patent is formulated for use specifically in an Ericsson thermodynamic cycle refrigerator and is disadvantageous as a result of its complexity in the number of magnetic compounds involved and in the form of the material as either an admixture or multi-layer.

An object of the present invention is to provide a magnetic refrigerant that exhibits magneto-thermal properties useful for a magnetic regenerator refrigerator using the Joule-Brayton thermodynamic cycle and that can be processed to useful form without the need for complex admixturing or multi-layering.

SUMMARY OF THE INVENTION

The present invention provides a low hysteresis magnetic refrigerant for a magnetic refrigerator using the known Joule-Brayton thermodynamic cycle comprising $(Dy_{1-x} Er_x)Al_2$ alloy wherein x is greater than 0 and less than 1 and is selected at a particular value (i.e. Dy/Er ratio) suitable for a Joule-Brayton cycle operable at a temperature in range of about 60 K. to about 10 K.

In an exemplary embodiment of the invention, the magnetic refrigerant comprises solely a $(Dy_{0.55} Er_{0.45})Al_2$ alloy having a substantially single phase as-cast microstructure.

In another exemplary embodiment of the invention, the magnetic refrigerant comprises solely a $(Dy_{0.5} Er_{0.5})Al_2$ alloy having a substantially single phase as-cast microstructure.

The present invention also provides a magnetic refrigerant particulates bed for a magnetic refrigerator using the Joule-Brayton cycle comprising solely $(Dy_{1-x} Er_x)Al_2$ particulates wherein x is as indicated above.

The present invention further provides a magnetic refrigerator and process using the Joule-Brayton thermodynamic cycle and a magnetic refrigerant comprising the ternary intermetallic alloys described hereabove without the need to admix or layer the refrigerant. The very low hysteresis exhibited by the refrigerants of the invention is advantageous in this regard.

The aforementioned objects and advantages will become more readily apparent form the following detailed description taken with the following drawings.

DETAILED DESCRIPTION

Figure 1A:
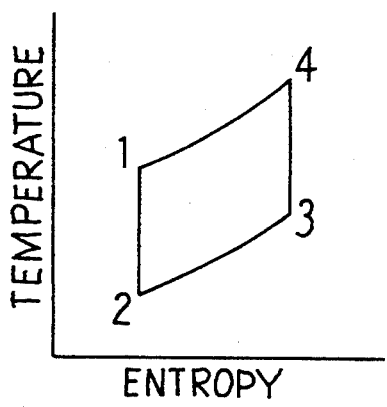
FIG. 1 is an illustration of the Joule-Brayton thermodynamic cycle.
Figure 1B:
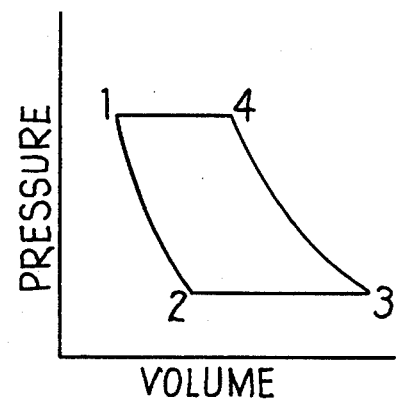

The magnetic refrigerant of the invention is useful in a magnetic refrigerator operating on the known Joule-Brayton (also referred to simply as Brayton) thermodynamic cycle. The Joule-Brayton cycle involves, as illustrated in FIG. 1, an adiabatic compression step/heating step/adiabatic expansion step/cooling step regardless of whether refrigeration is via gas working medium or magnetic refrigerant working medium. With respect to use of magnetic refrigerant, refrigeration is effected by cyclic heat dissipation and heat absorption in the course of adiabatic magnetization and adiabatic demagnetization of the magnetic refrigerant via application/discontinuance of external magnetic fields. The Joule-Brayton refrigeration cycle is used and described in the DeGregoria et al. article entitled TEST RESULTS OF AN ACTIVE MAGNETIC REGENERATIVE REFRIGERATOR, *Advances in Cryogenic Engineering*, Vol. 37, Part B, pages 875–882, 1992, and the DeGregoria article entitled MODELING THE ACTIVE MAGNETIC REGENERATOR, *Advances in Cryogenic Engineering*, Vol. 37, Part B, pages 867–873, 1992, the teachings of which are incorporated herein by reference. The Joule-Brayton refrigeration cycle for liquefaction of hydrogen and/or hydrogen slush typically can be efficiently conducted in the temperature range of about 60 K. to about 10 K.

The magnetic refrigerant of the invention useful in a Joule-Brayton type of magnetic refrigerator and process comprises an intermetallic ternary alloy or compound having the atomic formula $(Dy_{1-x} Er_x)Al_2$ wherein x is greater than 0 and less than 1 and is selected at a particular value (i.e. Dy/Er ratio) suitable for a Joule-Brayton cycle operable at a temperature in range of about 60 K. to about 10 K.

One preferred magnetic refrigerant material comprises $(Dy_{0.55} Er_{0.45})Al_2$. Another preferred magnetic refrigerant comprises $(Dy_{0.50} Er_{0.50})Al_2$.

Figure 2:
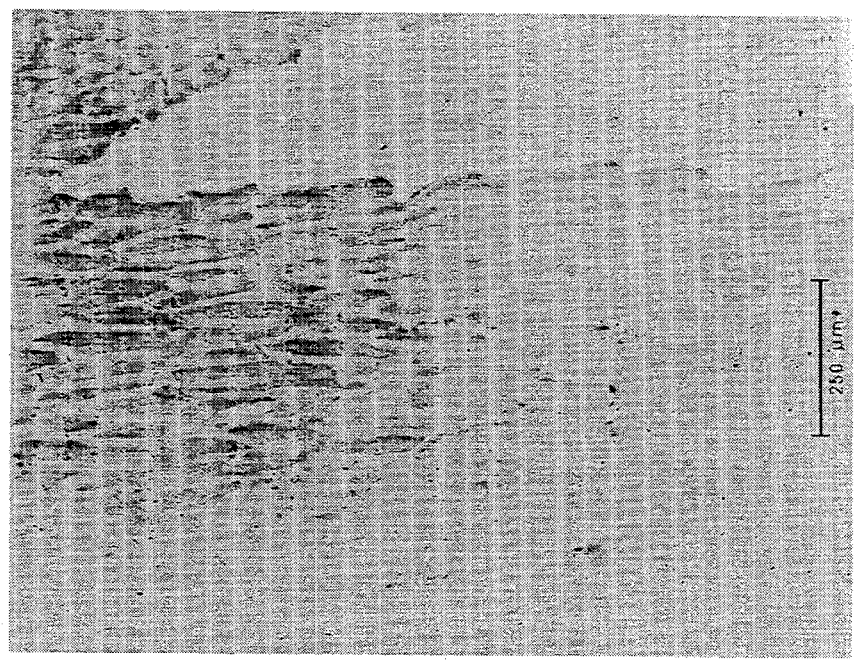
FIG. 2 is a photomicrograph at 80× of the as-cast microstructure of the $(Dy_{0.5} Er_{0.5})Al_2$ alloy of the invention.

Ternary alloys for use in the invention are prepared by first arc-melting a mixture of the Dy and Er lanthanide elements in proper proportions on a water-cooled copper hearth. The arc-melted lanthanide component material is solidified and then arc-melted with an appropriate amount of Al on a water-cooled copper hearth to form the as-cast ternary alloy having a substantially single phase microstructure, FIG. 2. The as-cast ternary alloy does not require heat treatment and can be used as a magnetic refrigerant in the as-cast condition.

The starting lanthanide metals were 99.8+ atomic % pure, and the Al was greater than 99.99% pure as determined by the commercial supplier.

The ternary alloys described hereabove are formed into particulates for use as a magnetic refrigerant, such as a refrigerant particulates bed, in a Joule-Brayton refrigerator. The as-cast alloys can be ground or crushed to particulates, for example 0.1 to 2 millimeters in size, to this end. Alternately, the alloy can be melt atomized to form powder to this same end. A magnetic refrigerant particulates bed is known and shown in the aforementioned DeGregoria et al. article incorporated herein by reference.

FIGS. 3–6 and 17–20 illustrate the results of heat capacity tests conducted on respective as-cast $(Dy_{0.50} Er_{0.50})Al_2$ and $(Dy_{0.55} Er_{0.45})Al_2$ alloy specimens of the invention. The heat capacity was measured in accordance with the procedures described by the Ikeda et al. article entitled HEAT CAPACITIES IN SUPERCONDUCTING AND NORMAL-STATE $LaS_x$ ($1.333 \leq X \leq 1.55$) COMPOUNDS, *Physical Review B*, Vol. 25, Number 7, pages 4604–4617, (1982) the teachings of which are incorporated herein by reference.

Figure 3:
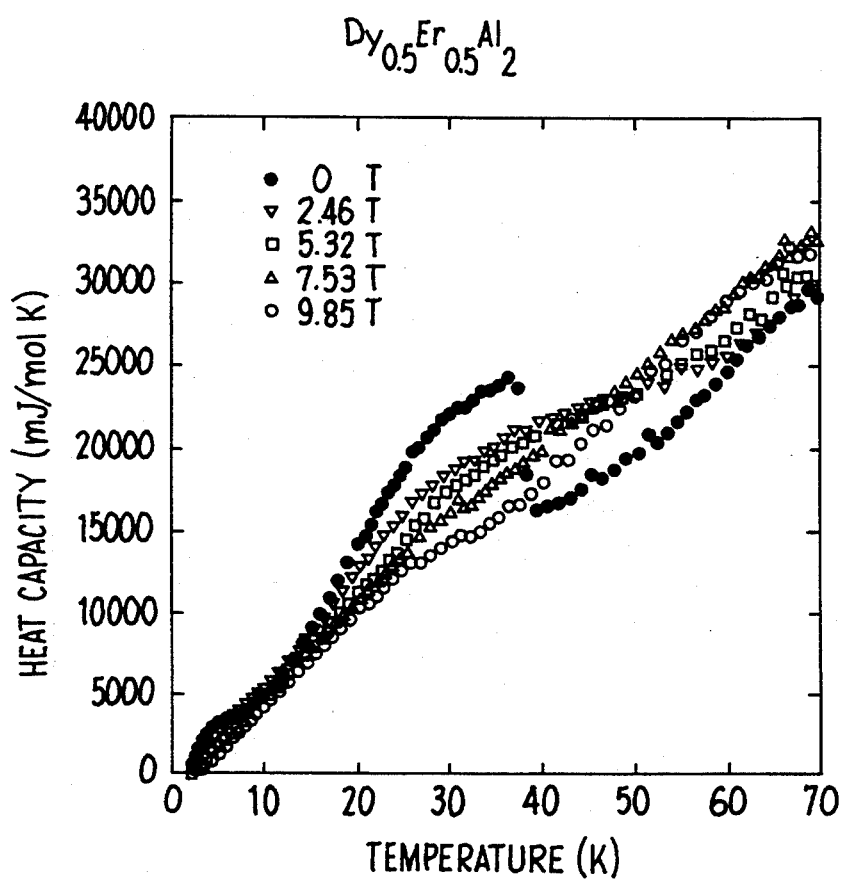
FIG. 3 is a graph of heat capacity versus temperature for the magnetic field changes set forth for the $(Dy_{0.5} Er_{0.5})Al_2$ alloy.
Figure 4:
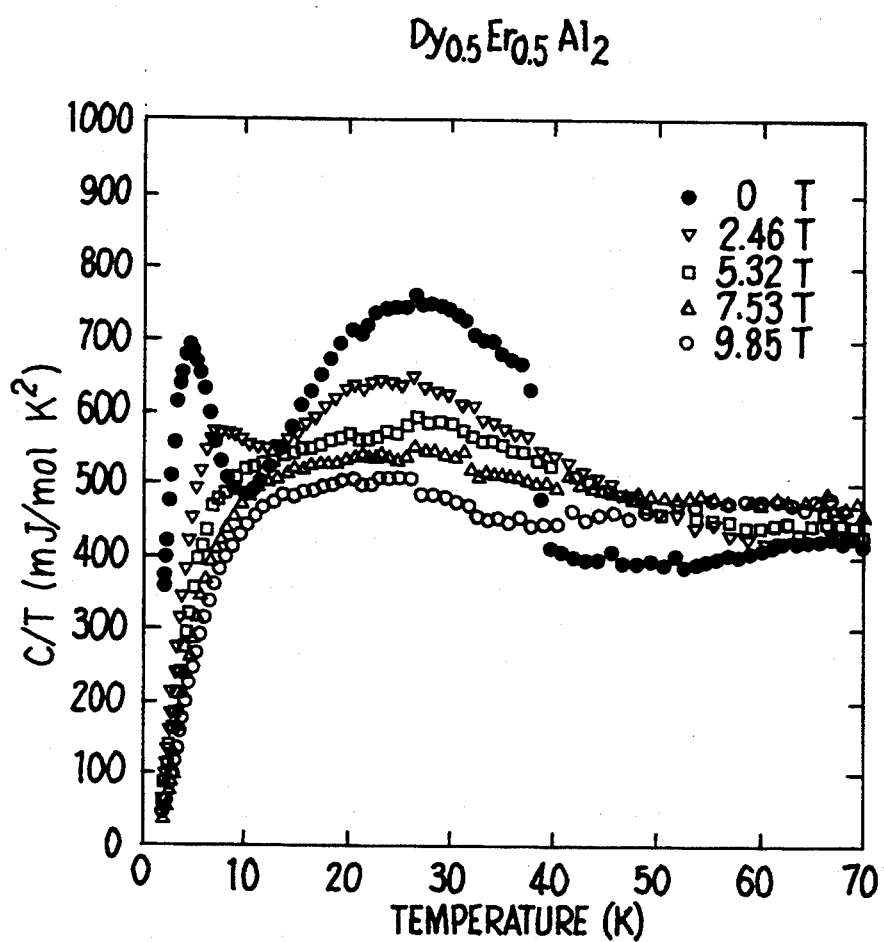
FIG. 4 is a graph of C/T versus T for the magnetic fields set forth for the $(Dy_{0.5} Er_{0.5})Al_2$ alloy.
Figure 5:
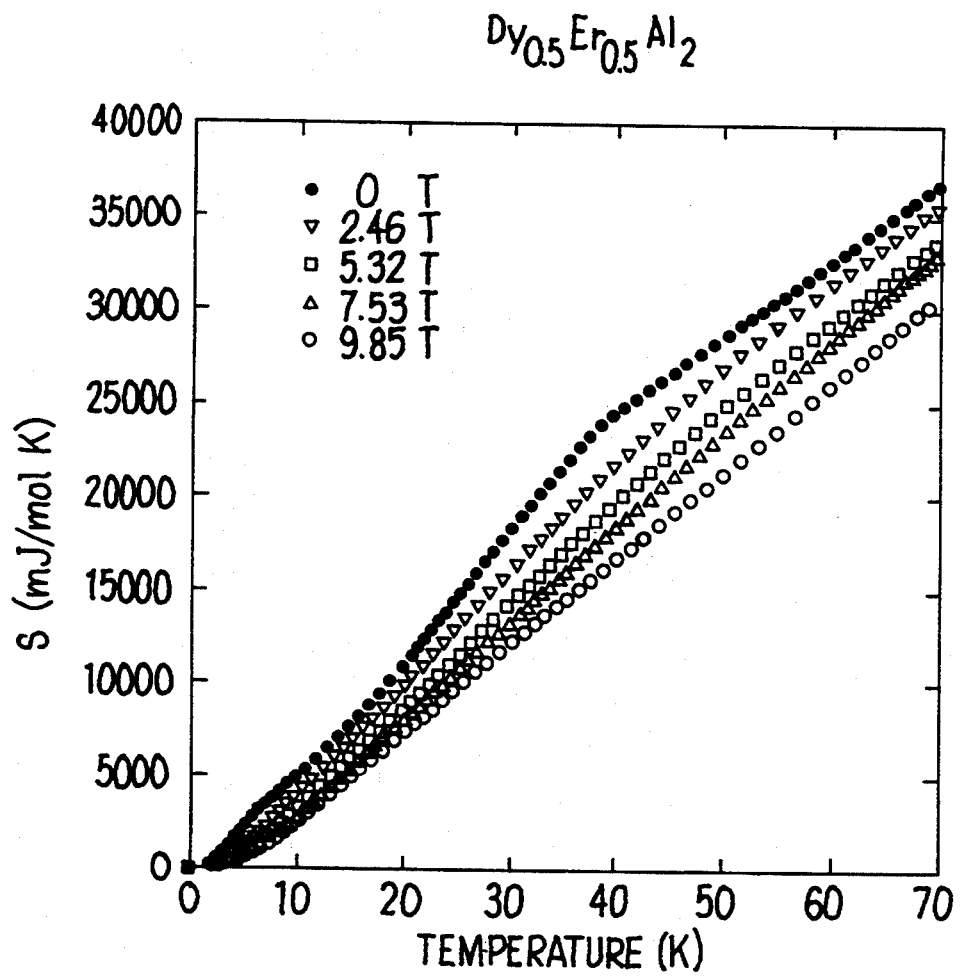
FIG. 5 is a graph of entropy versus temperature for the magnetic fields set forth for the $(Dy_{0.5} Er_{0.5})Al_2$ alloy.
Figure 6:
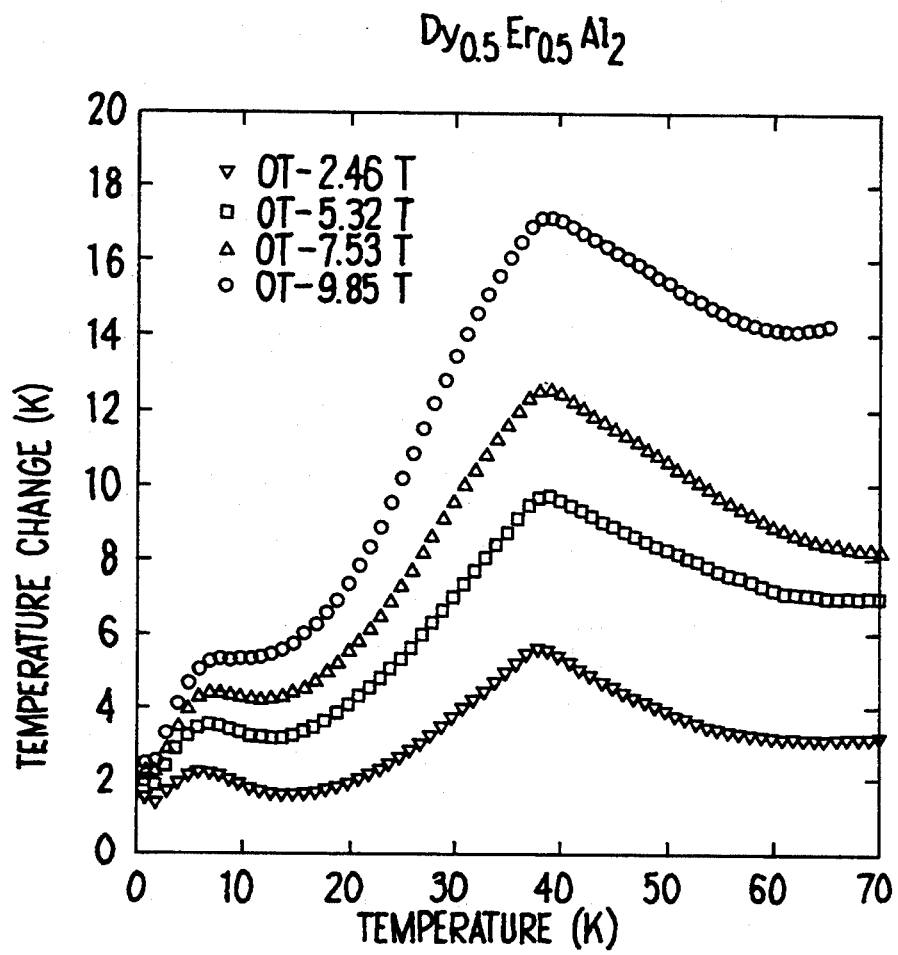
FIG. 6 is a graph of calculated temperature change ΔTmc (magnetocaloric effect) versus temperature for the magnetic field changes set forth for the $(Dy_{0.5} Er_{0.5})Al_2$ alloy.
Figure 7:
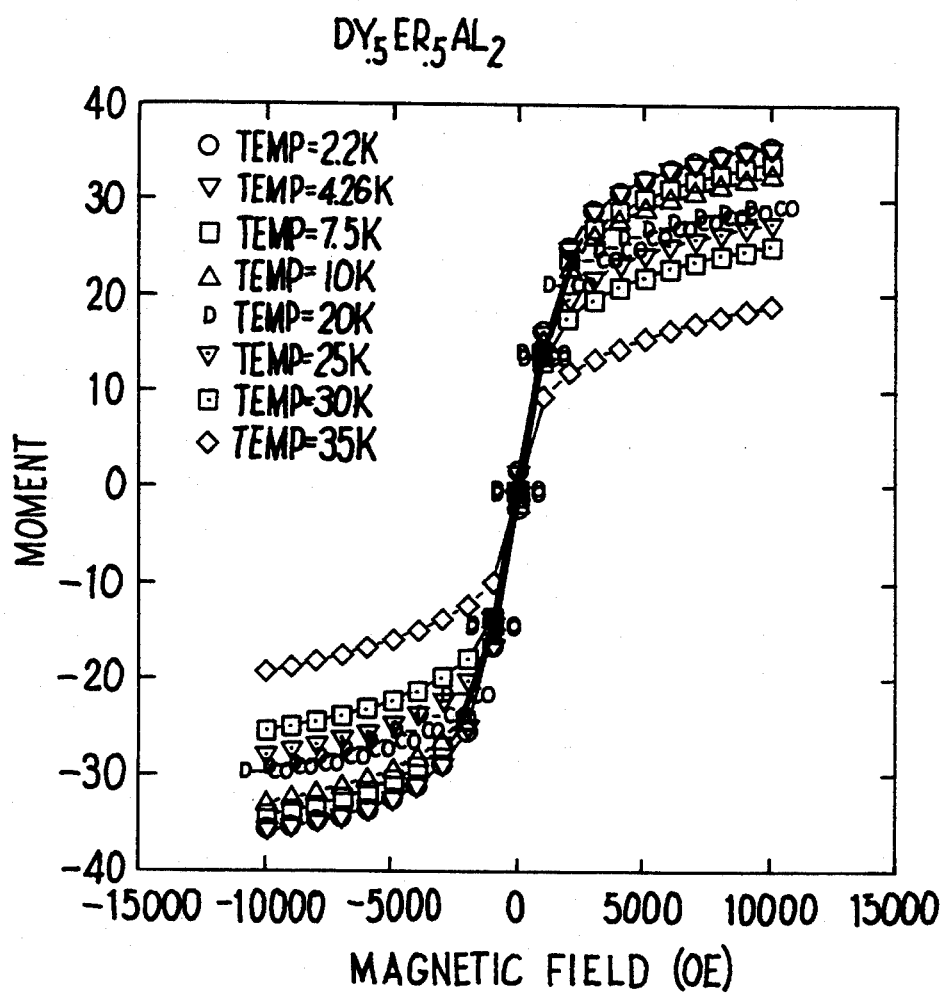
FIGS. 7, 8, and 9 are graphs of magnetic moment versus magnetic field for the temperatures set forth for the $(Dy_{0.5} Er_{0.5})Al_2$ alloy illustrating the low hysteresis upon magnetization/demagnetization.
Figure 8:
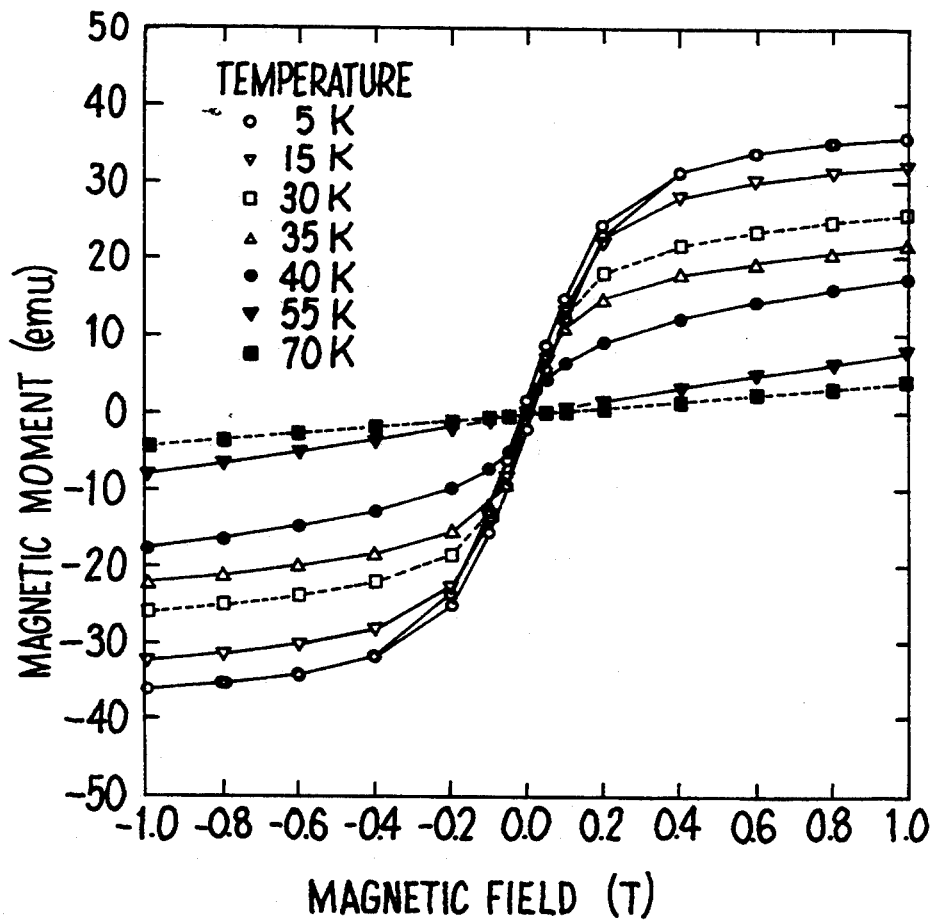
Figure 9:
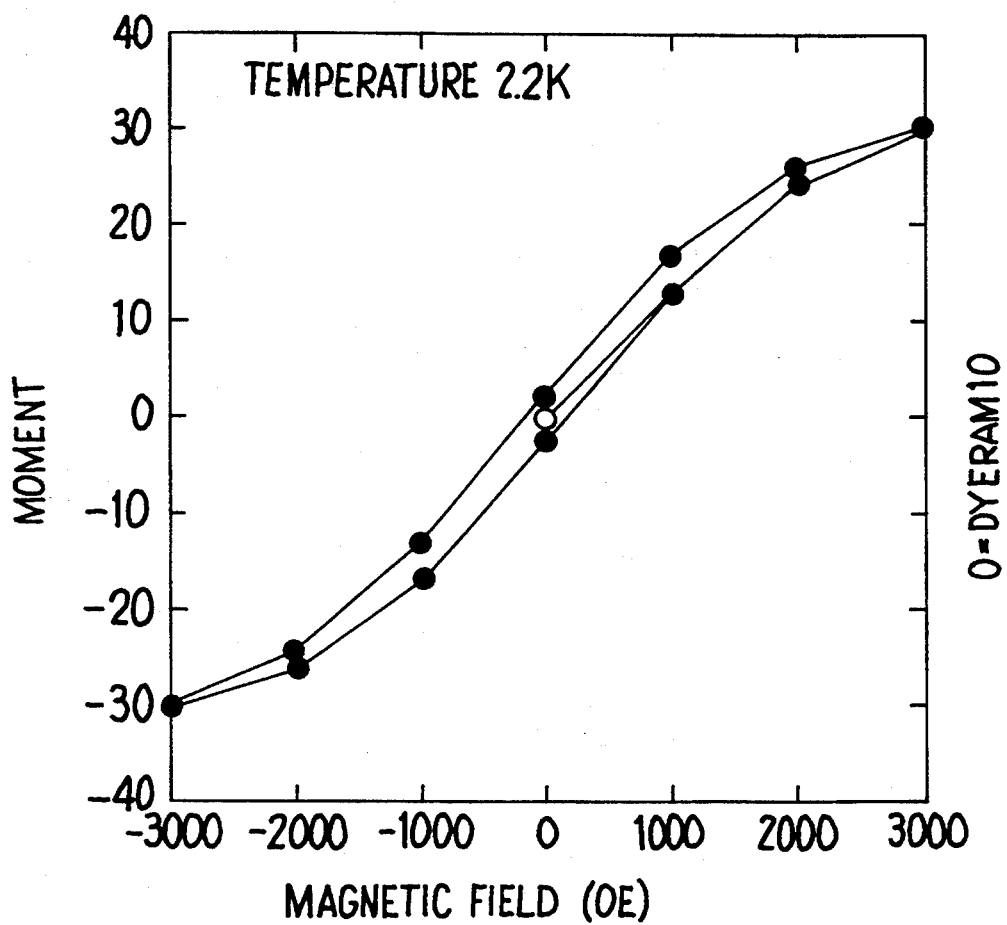
Figure 10:
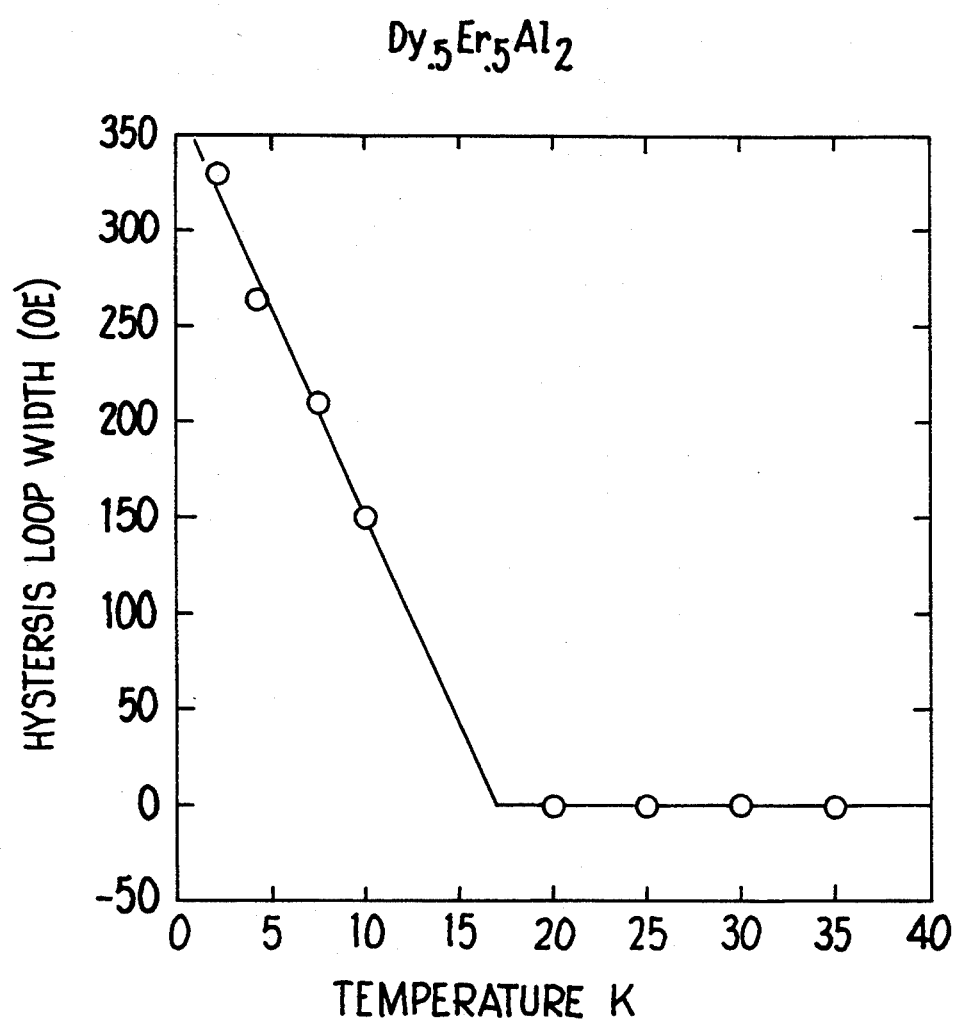
FIG. 10 is a graph of hysteresis loop width versus temperature for the $(Dy_{0.5} Er_{0.5})Al_2$ alloy illustrating minimal hysteresis above about 16.5° K.
Figure 17:
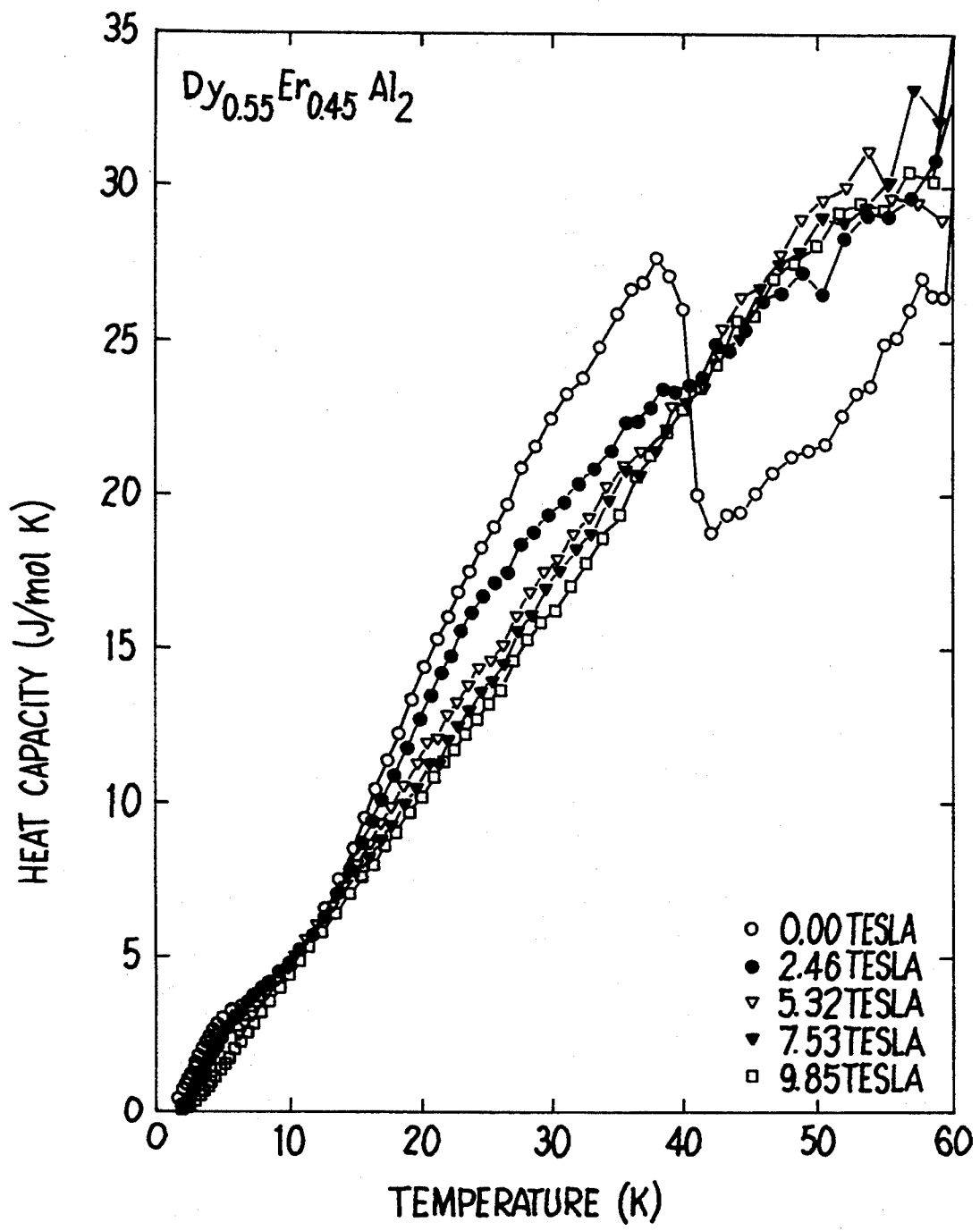
FIG. 17 is a graph of heat capacity versus temperature for the magnetic fields set forth for the $(Dy_{0.55} Er_{0.45})Al_2$ alloy.
Figure 18:
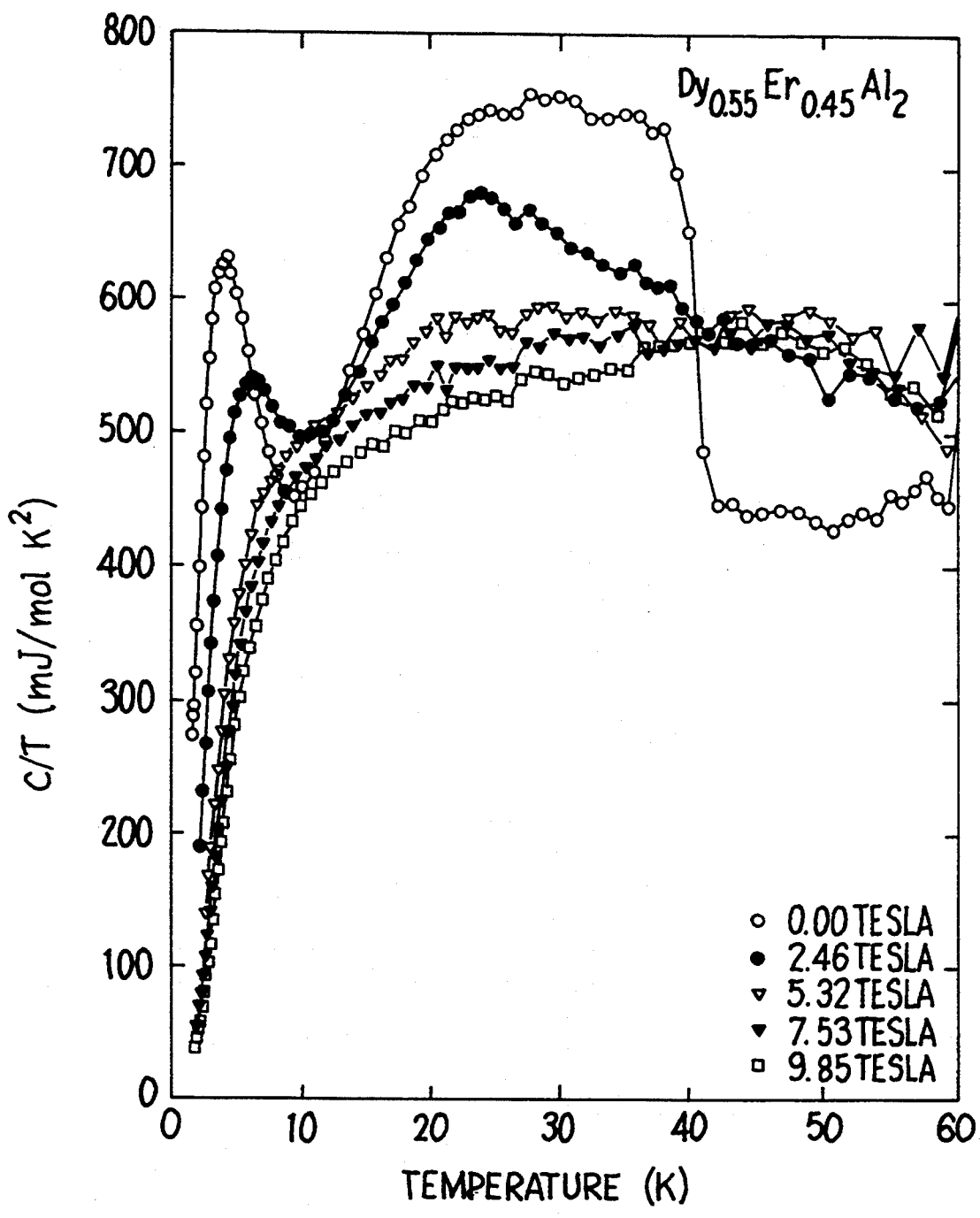
FIG. 18 is a graph of C/T versus T for the magnetic fields set forth for the $(Dy_{0.55} Er_{0.45})Al_2$ alloy.
Figure 19:
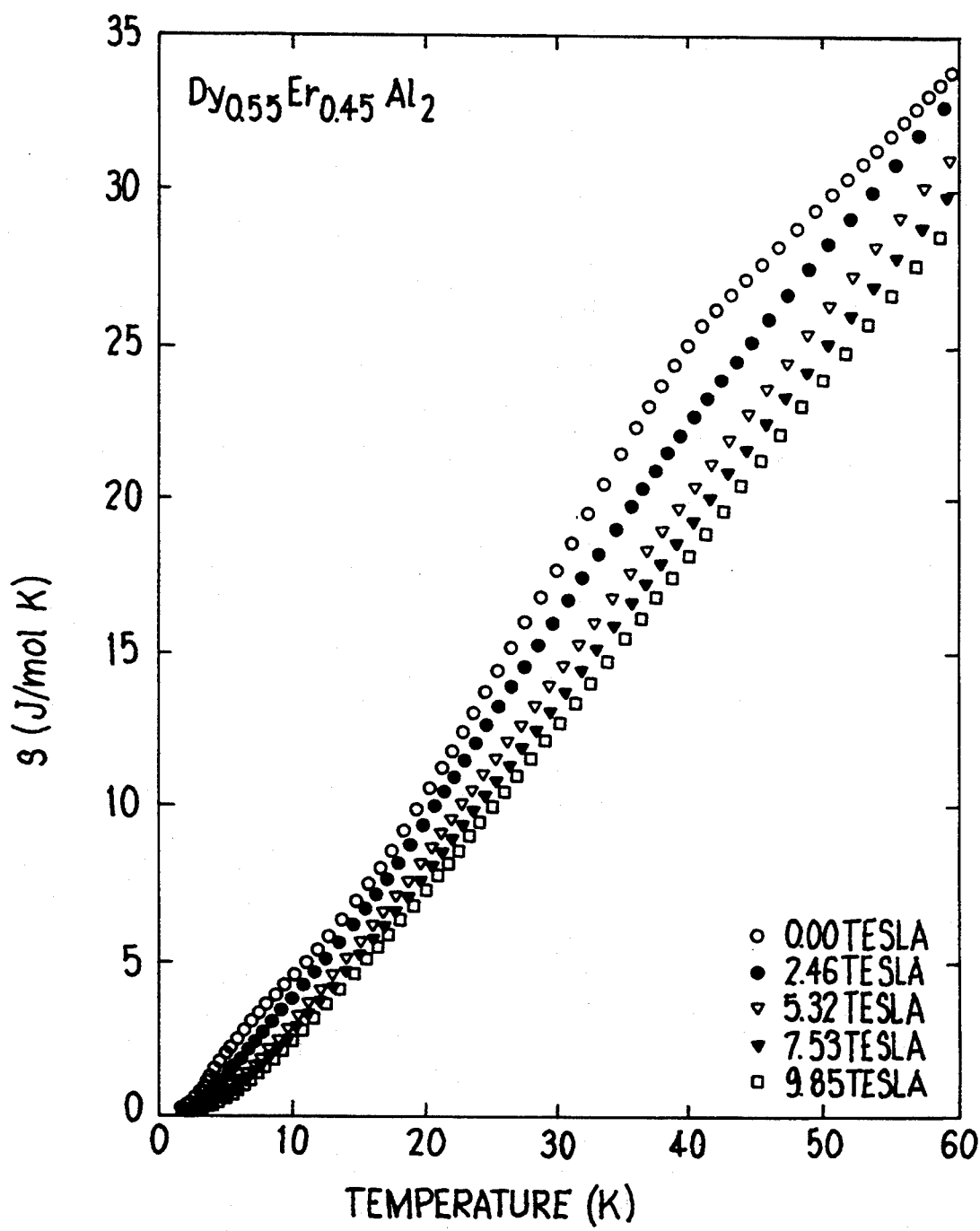
FIG. 19 is a graph of entropy versus temperature for the magnetic fields set forth for the $(Dy_{0.55} Er_{0.45})Al_2$ alloy.
Figure 20:
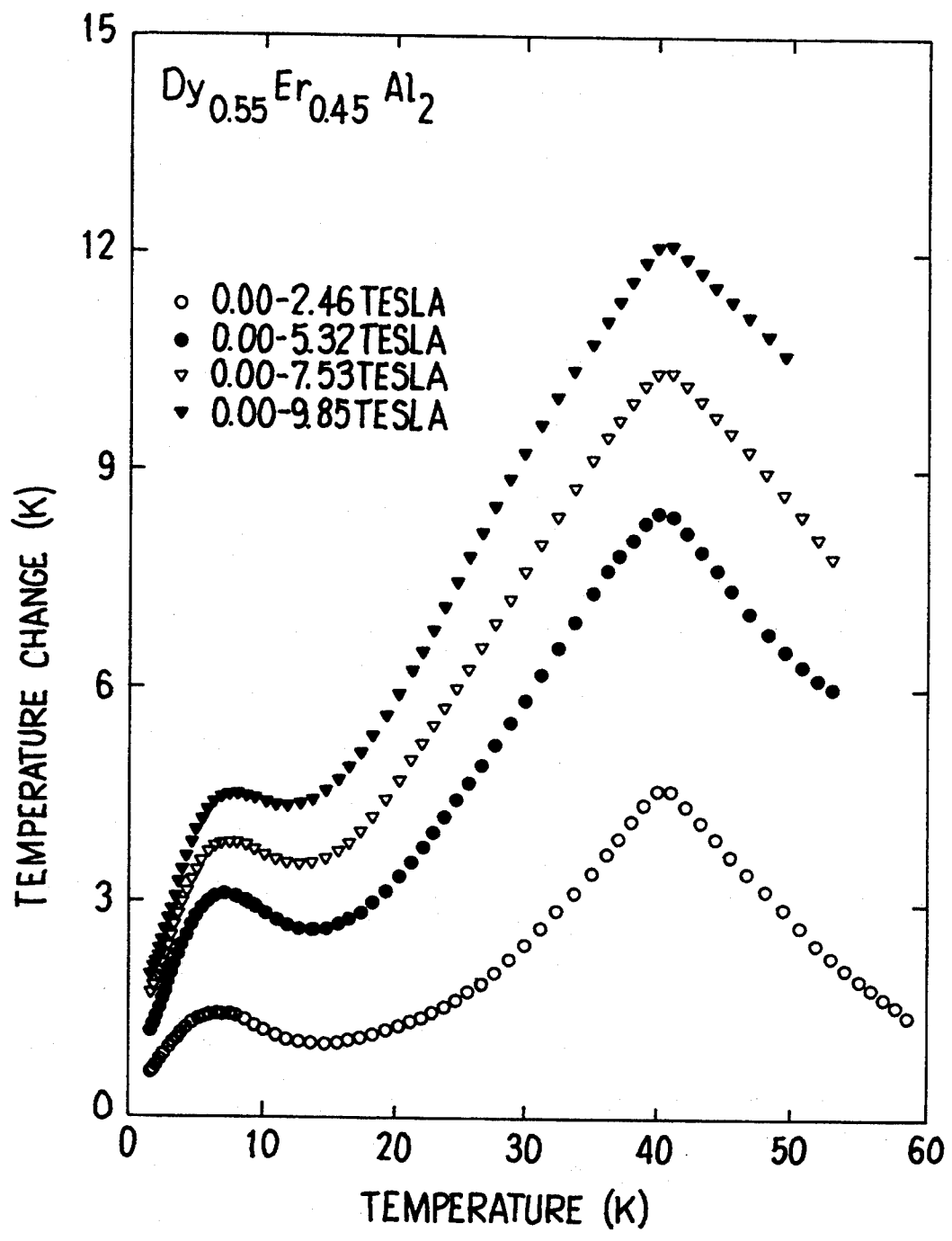
FIG. 20 is a graph of calculated temperature change ΔTmc (magnetocaloric effect) versus temperature for the magnetic field changes set forth for the $(Dy_{0.55} Er_{0.45})Al_2$ alloy.
Figure 26A:
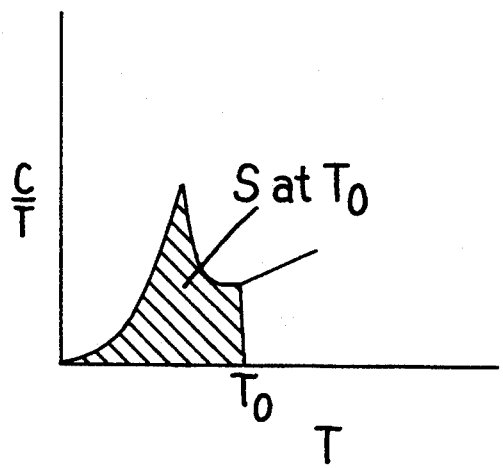
FIG. 26A is a graphic illustration of the integration of the C/T versus temperature curve to obtain entropy.
Figure 26B:
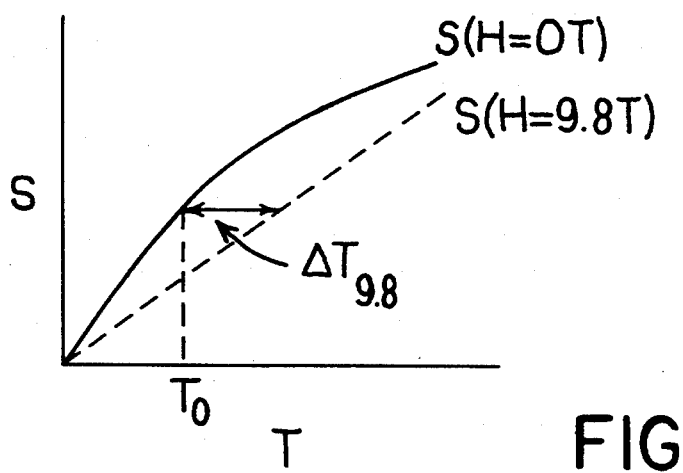
FIG. 26B is a graphic illustration of the determination of the adiabatic temperature change from the entropy versus temperature curve.
Figure 27:
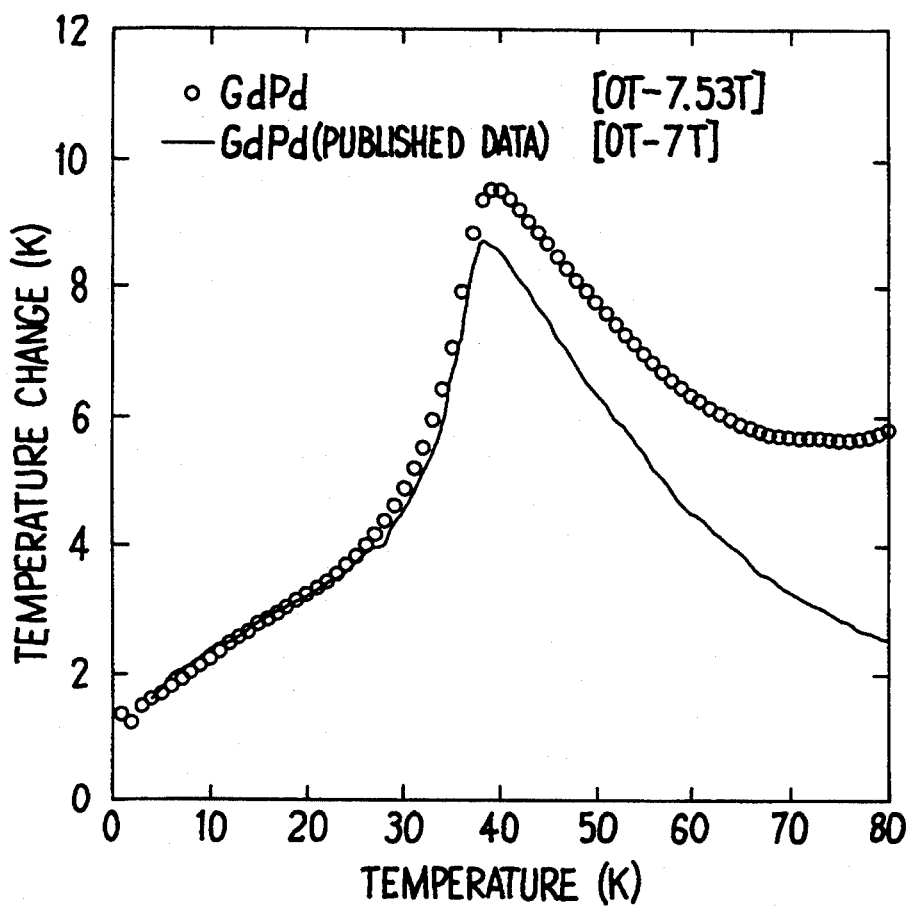
FIG. 27 is a graph of temperature change versus temperature measured and reported in the literature (solid line) for a GdPd magnetic alloy for a magnetic field changes from 0 to 7 Tesla (T) and as calculated by Applicants from measured heat capacity data for a like alloy for magnetic field changes from 0 to 7.53 T.

In general, FIGS. 3 and 17 are the heat capacity from approximately 1.5 to approximately 70 K. and 60 K., respectively, for five different magnetic fields (i.e. 0, 2.46, 5.32, 7.53, and 9.85 T-tesla). FIGS. 5 and 19 are entropy versus temperature (0 to approximately 70 K.) for the same fields. FIGS. 6 and 20 are the calculated temperature increases (magnetocaloric effect) due to changing the magnetic field. The temperature change ΔTmc versus temperature curves were calculated from the heat capacity data by first integrating the C/T versus T curve (where C is heat capacity in millijoules/mole degree K. and T is temperature in K.) as illustrated in FIG. 26A. Then, the adiabatic temperature change was determined from the entropy versus temperature curve as illustrated in FIG. 26B to allow the temperature change versus temperature curve to be calculated as indicative of the magnetocaloric effect. The heat capacity data above 50 to 70 K. show considerable scatter and may tend to be too large. For example, referring to FIG. 27, the temperature change versus temperature for a reference GdPd magnetic alloy is shown as calculated using the same techniques used to generate FIGS. 6 and 20 discussed hereabove. The temperature change versus temperature curve generated using this technique is compared to a similar measured (not calculated) curve for the same alloy as reported in by Zimm et al. in the article entitled "MATERIALS FOR REGENERATIVE MAGNETIC COOLING SPANNING 20 K. TO 80 K.", *Adv. Cryogenic Eng.*, 37, (Part B), 883, (1992). The curves of FIG. 27 indicate that the temperature change (magnetocaloric effect) versus temperature results used by Applicants were consistent with the direct measurements reported in the aforementioned literature.

For the exemplary $(Dy_{0.5} Er_{0.5})Al_2$ magnetic alloy of the invention, the heat capacity results reveal a small magnetic ordering peak or temperature at approximately 4 K. in addition to the ferromagnetic ordering observed at approximately 38 K. These peaks are more evident in the C/T versus T graph of FIG. 4. The estimated magnetic entropies associated with the two peaks are 4.9 and 15.6 J/mol K., respectively. The two ferromagnetic ordering peaks are also evident in FIGS. 5 and 6.

Referring to FIG. 6, it is apparent that the $(Dy_{0.5} Er_{0.5})Al_2$ alloy exhibits a fairly sharp delta shaped curve similar to that of GdPd refrigerant shown for comparison. The value of the peak of the magnetocaloric effect at $\Delta Tmc$ for the $(Dy_{0.5} Er_{0.5})Al_2$ alloy is approximately 3 K. larger than that of the GdPd refrigerant (assuming the 0.53 T difference in the upper magnetic field is equivalent to approximately 0.5 degree K. in $\Delta Tmc$). The $(Dy_{0.5} Er_{0.5})Al_2$ refrigerant can used in lieu of GdPd refrigerant in liquefaction of hydrogen in active regenerator refrigerators using the Joule-Brayton cycle. As mentioned hereabove, the $(Dy_{0.5} Er_{0.5})Al_2$ refrigerant can be used in the as-cast condition without the need for a microstructure homogenizing heat treatment.

Referring to FIGS. 7–10, the $(Dy_{0.5} Er_{0.5})Al_2$ refrigerant is shown to advantageously exhibit a low hysteresis upon magnetization/demagnetization. At temperatures above 16.5° K., the $(Dy_{0.5} Er_{0.5})Al_2$ refrigerant exhibits substantially zero hysteresis as shown best in FIG. 10.

Figure 11:
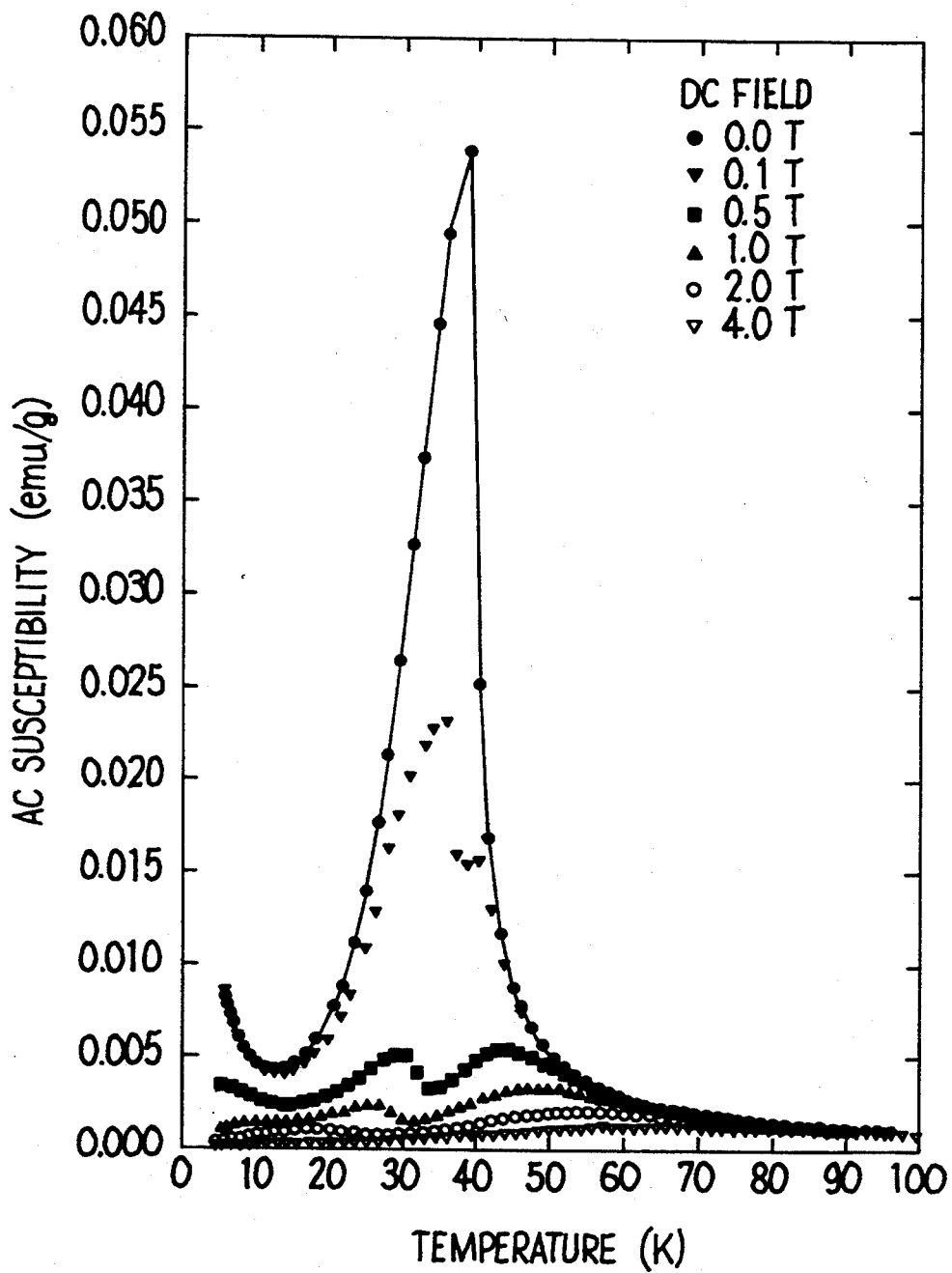
FIGS. 11, 12, 13, 14, 15 and 16 are graphs of AC susceptibility versus temperature for the AC and DC fields and frequencies set forth for the $(Dy_{0.5} Er_{0.5})Al_2$ alloy.
Figure 12:
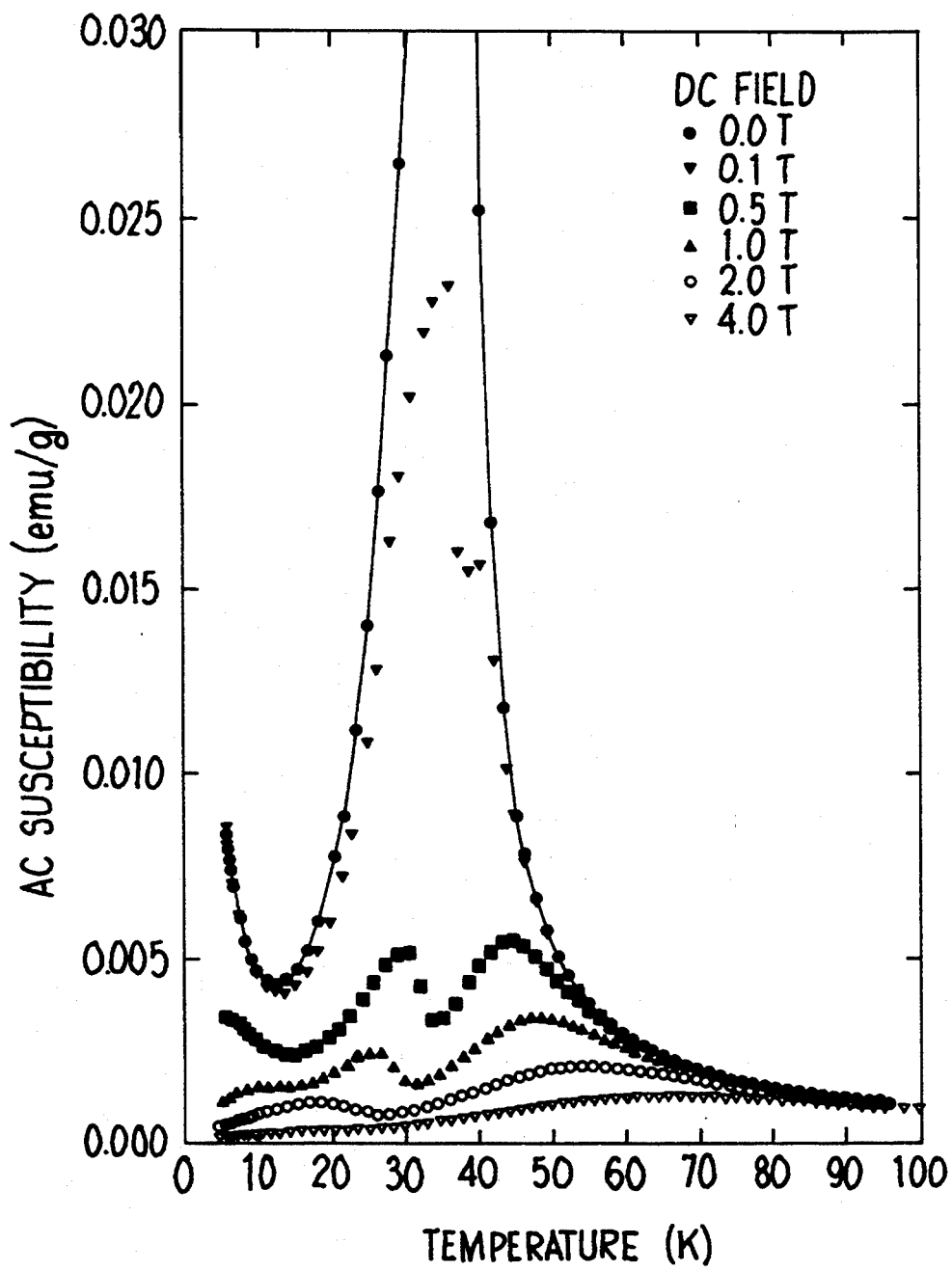
Figure 13:
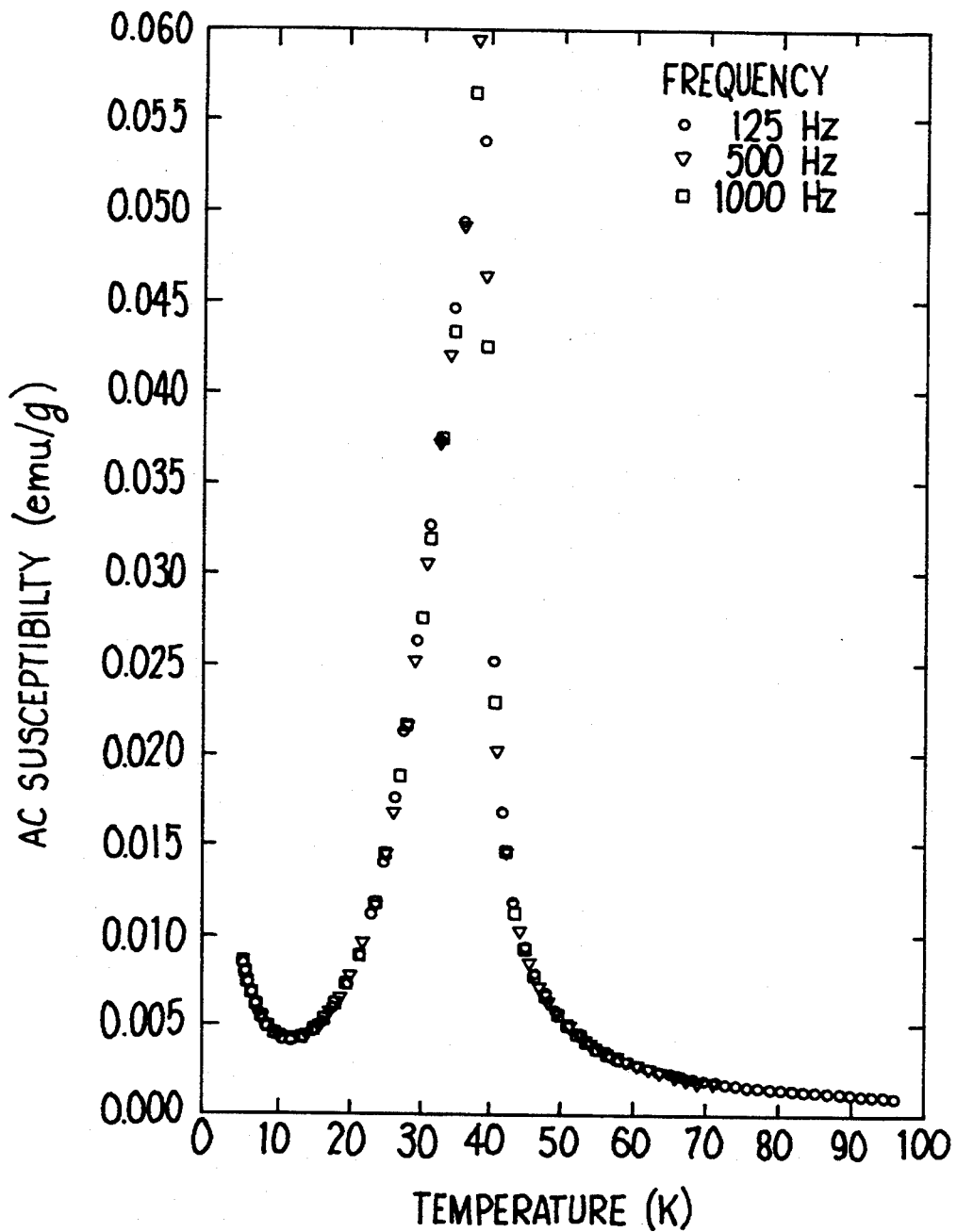
Figure 14:
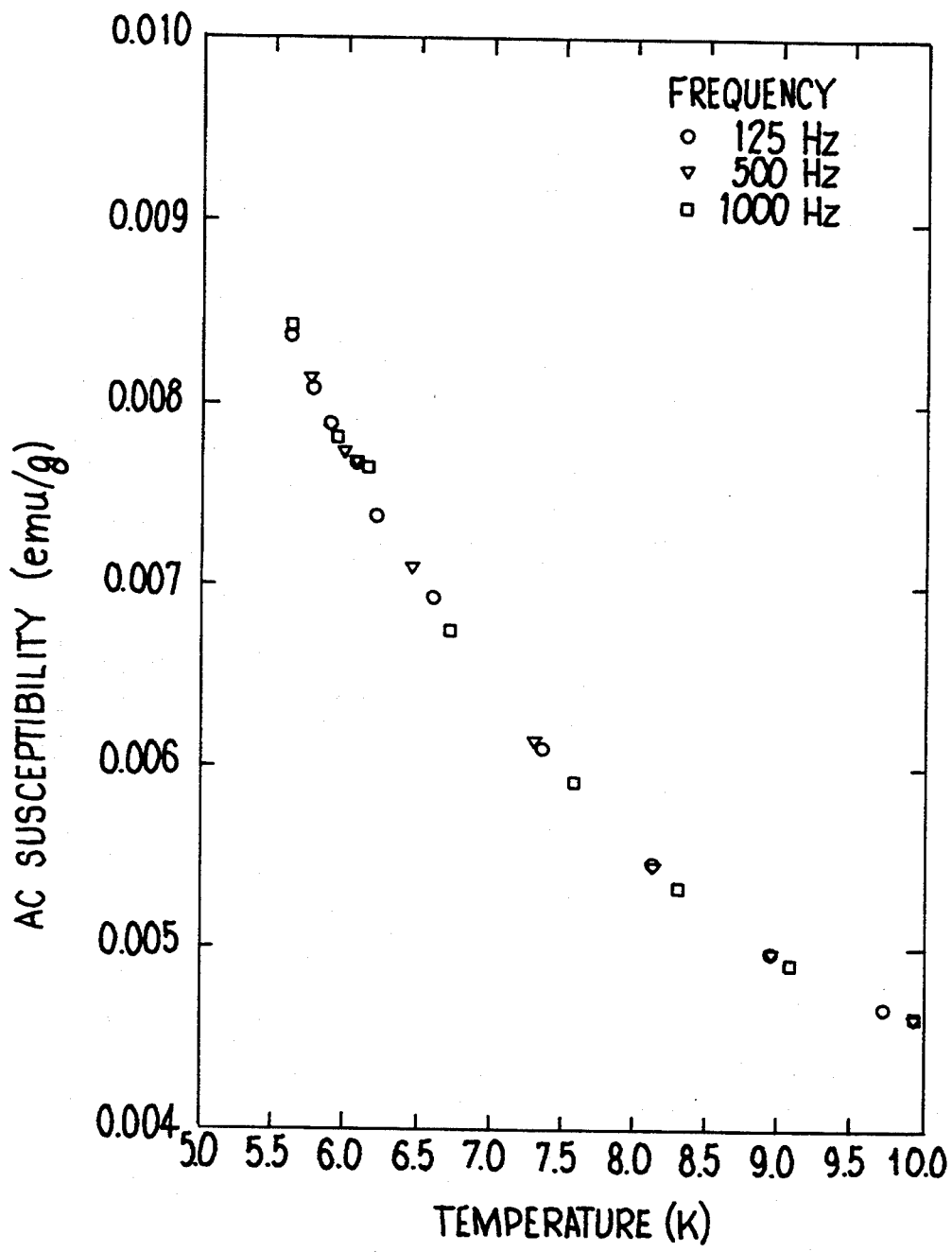
Figure 15:
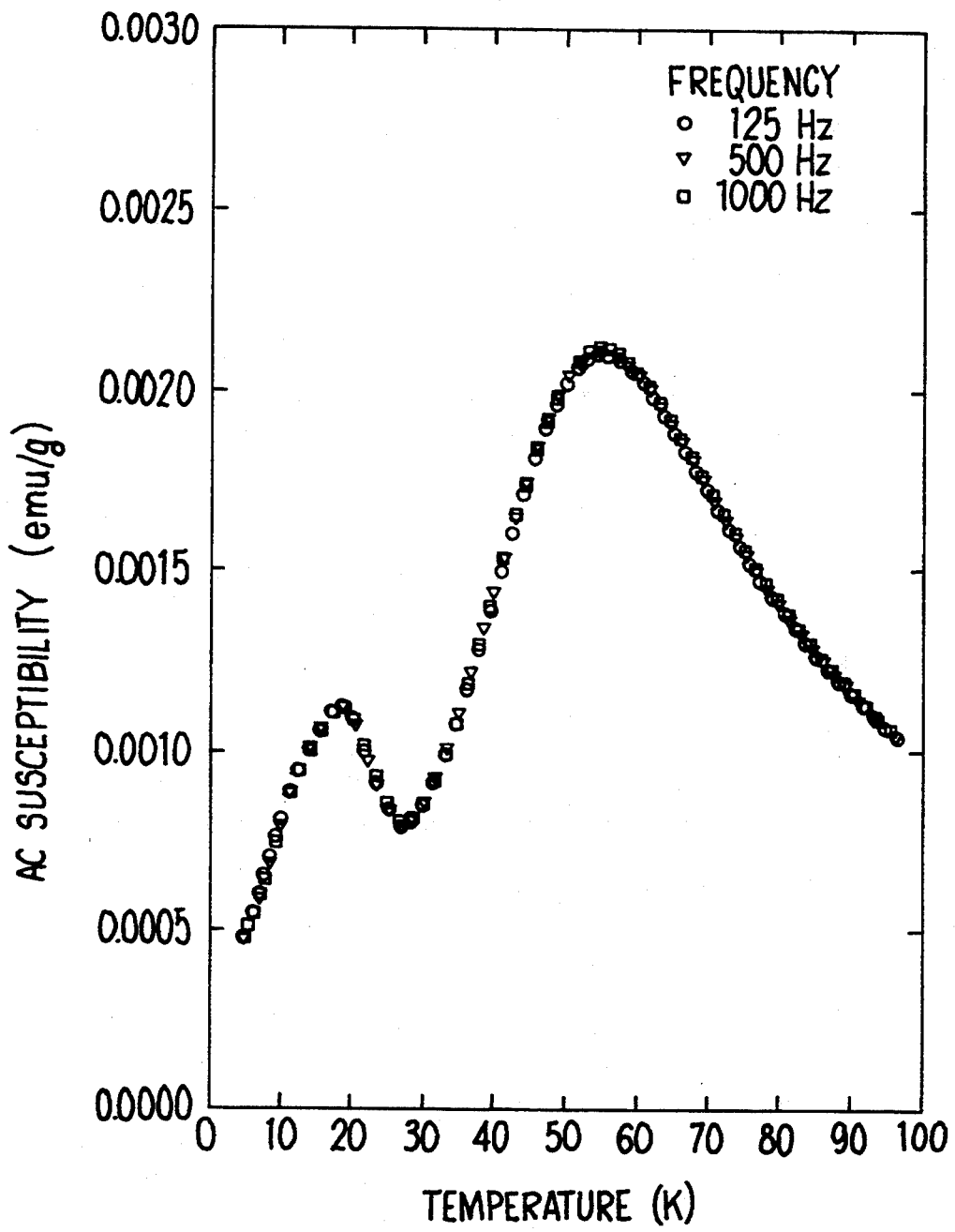
Figure 16:
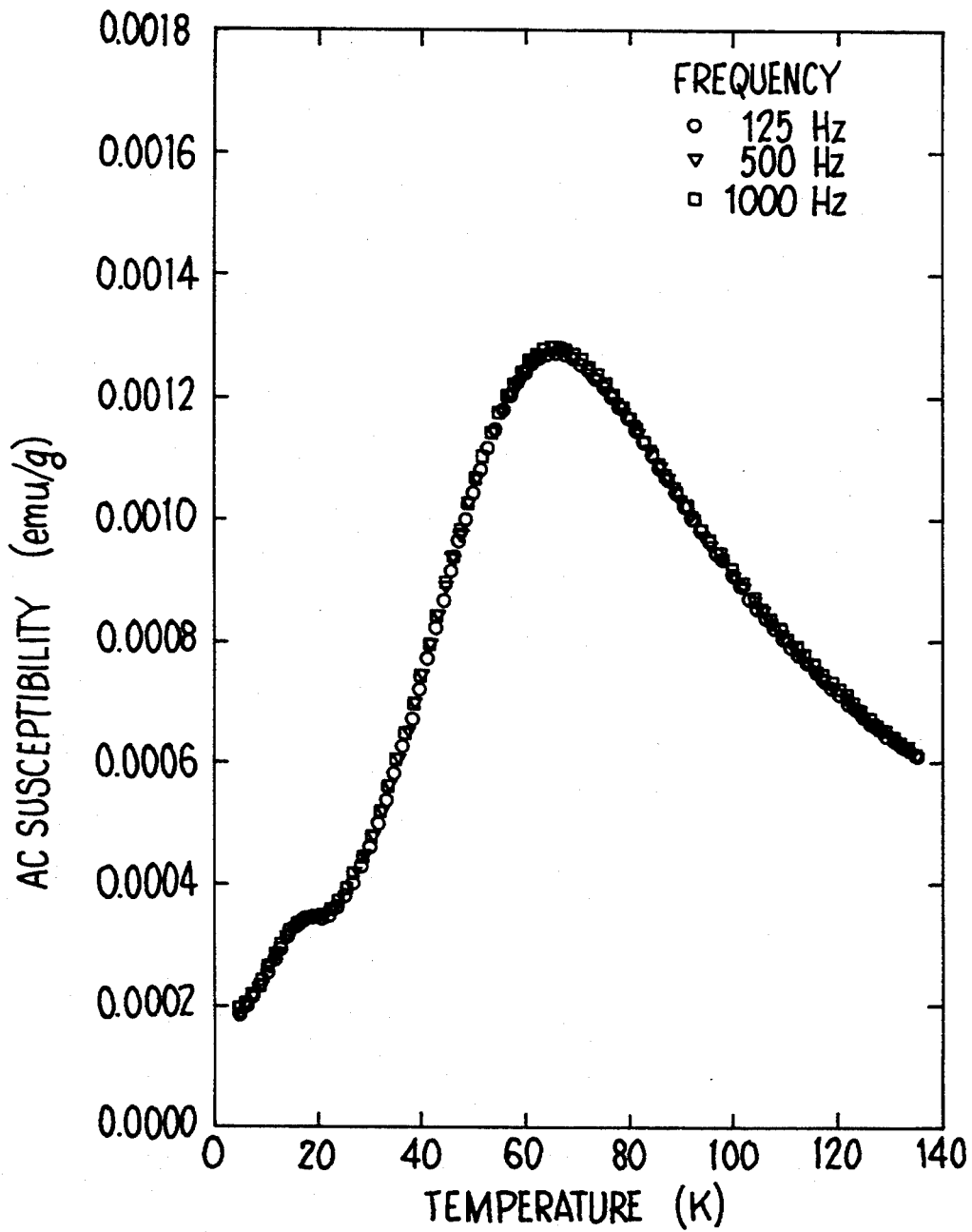

FIGS. 11–14 illustrate AC susceptibility of the $(Dy_{0.5} Er_{0.5})Al_2$ refrigerant and illustrate a magnetic ordering peak at approximately 38 K. at the DC/AC field and frequencies investigated. FIGS. 15–16 illustrate that the 4 K. and 38 K. peaks shift to higher temperatures: 18 K. and 54 K./, respectively, in an applied DC field of 2.0 T (20 kOe) (FIG. 15); and to 13 K. and 47 K., respectively, in an applied DC field of 4.0 T (40 kOe) (FIG. 16). Furthermore, these two figures and also FIGS. 13 and 14 illustrate that the ac magnetic susceptibility is independent of the applied ac frequence, citing further evidence that these two peaks are due ferromagnetic ordering.

For the exemplary $(Dy_{0.55} Er_{0.45})Al_2$ magnetic alloy of the invention, the heat capacity results reveal a small magnetic ordering peak or temperature at approximately 4 K. (FIG. 17) in addition to the ferromagnetic ordering observed at approximately 42 K. These peaks are more evident in the C/T versus T graph of FIG. 18. The estimated magnetic entropies associated with the two peaks are 4.2 and 15.0 J/mol K., respectively.

Referring to FIG. 17, it is apparent that the $(Dy_{0.55} Er_{0.45})Al_2$ alloy exhibits a fairly sharp delta shaped curve similar to that of GdPd refrigerant. The value of the ordering peak at $\Delta Tmc$ for the $(Dy_{0.55} Er_{0.45})Al_2$ alloy is smaller than that of the $(Dy_{0.50} Er_{0.50})Al_2$ and approximately 1 K. larger than that of the GdPd refrigerant (assuming the 0.53 T difference in the upper magnetic field is equivalent to approximately 0.5 degree K. in $\Delta Tmc$ for GdPd). The $(Dy_{0.55} Er_{0.45})Al_2$ refrigerant can used in lieu of GdPd refrigerant in liquefaction of hydrogen in active regenerator refrigerators using the Joule-Brayton cycle. As mentioned hereabove, the $(Dy_{0.55} Er_{0.45})Al_2$ refrigerant can be used in the as-cast condition without the need for a microstructure homogenizing heat treatment.

Figure 21:
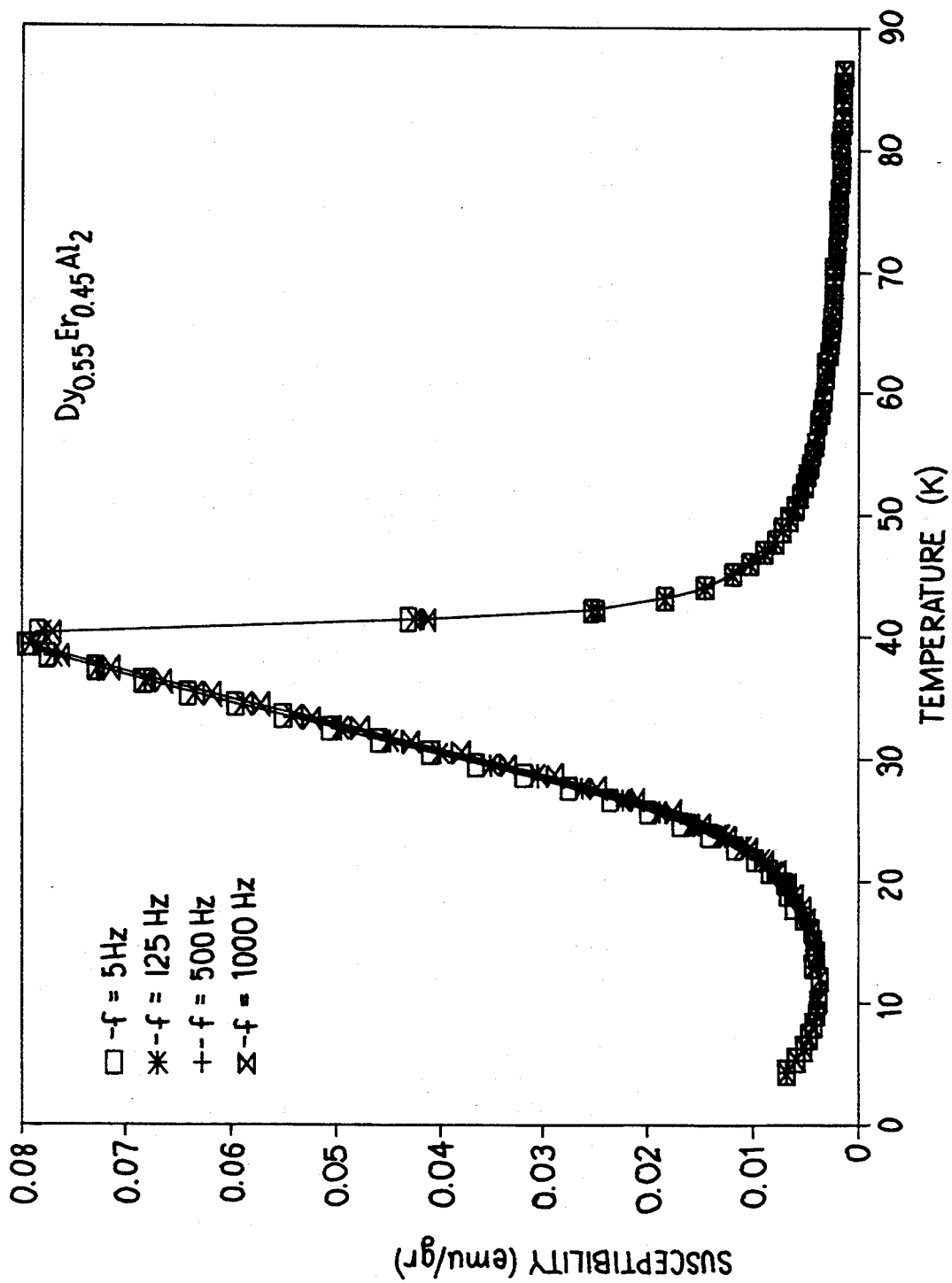
FIG. 21 is a graph of susceptibility versus temperature at the frequencies set forth and an AC field of 1.25 Oe for the $(Dy_{0.55} Er_{0.45})Al_2$ alloy.
Figure 22:
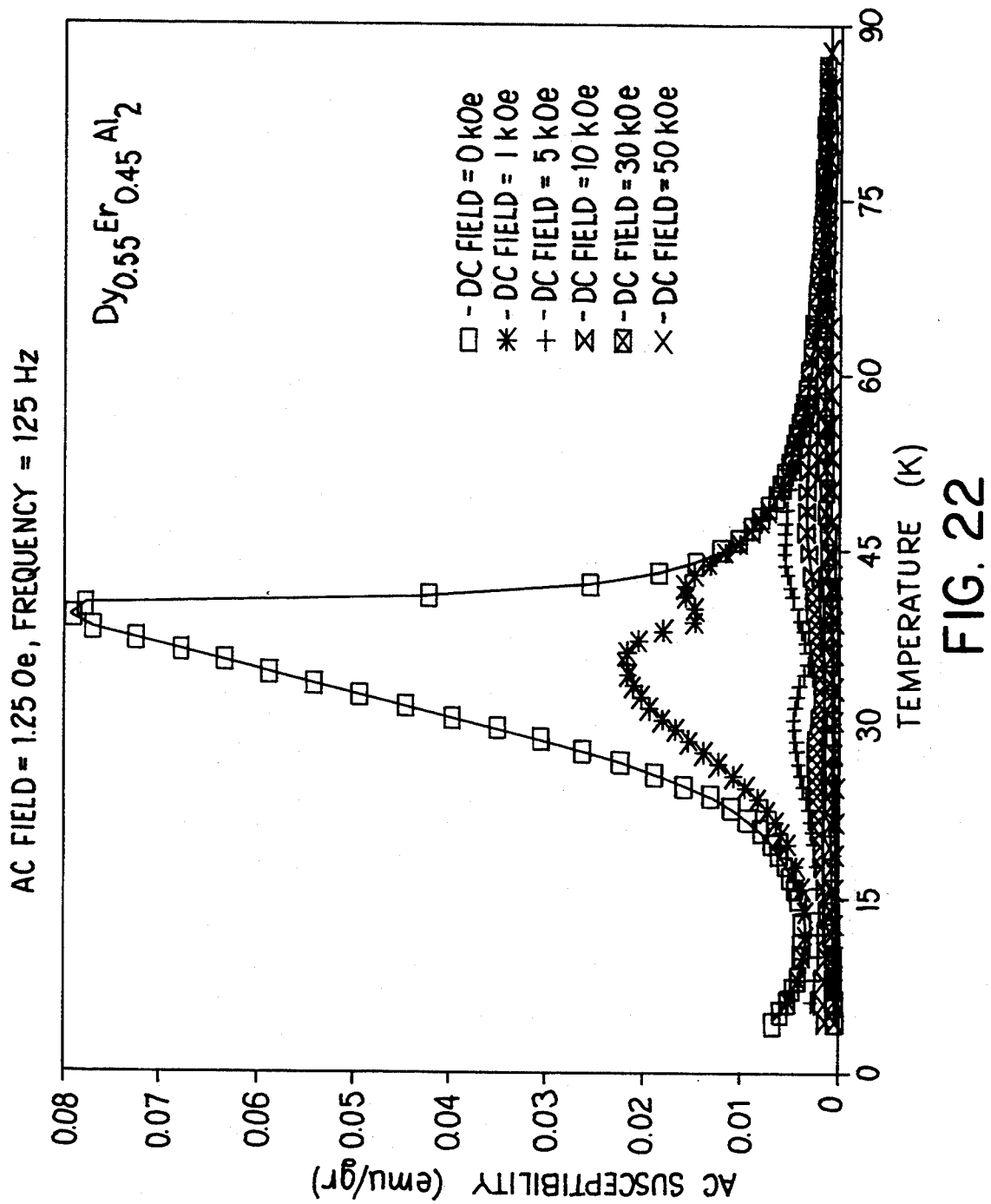
FIGS. 22 and 23 are graphs of AC susceptibility versus temperature for the AC and DC fields and frequencies set forth for the $(Dy_{0.5} Er_{0.5})Al_2$ alloy.
Figure 23:
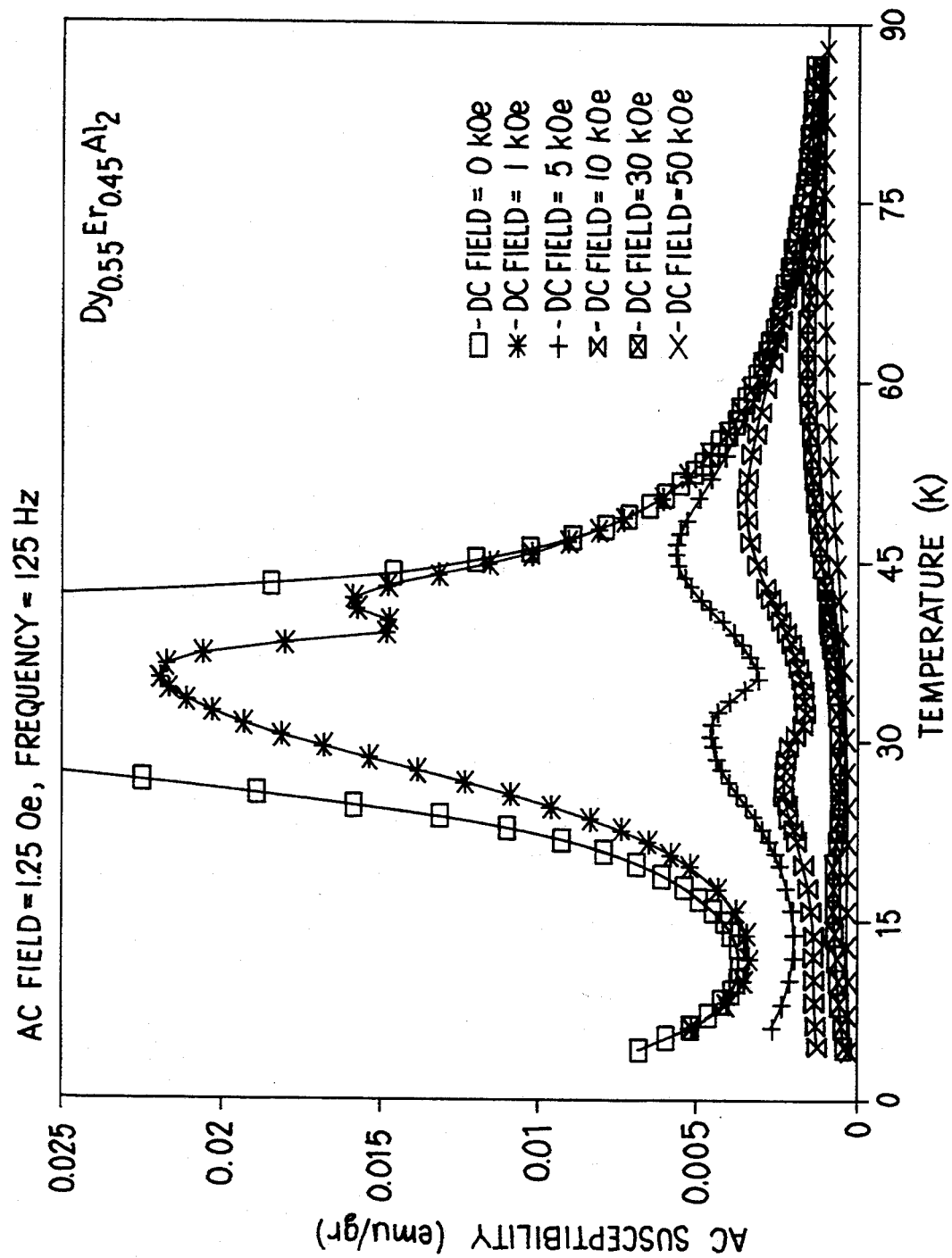

FIGS. 21–23 illustrate the AC susceptibility of the $(Dy_{0.55} Er_{0.45})Al_2$ refrigerant and illustrate a magnetic ordering peak at approximately 39 K. at the DC/AC field and frequencies investigated. FIGS. 22–23, as well as FIGS. 11–12, illustrate that the single ordering peak splits into two peaks when the applied DC field is between 0.1 and 3.0 T (1 and 30 kOe). The upper peak is probably associated with change of the Dy 4f moments (spins) along the <100> direction at low fields to the <111> direction at higher DC fields, while the lower peak is associated with the Er 4f moments (spins) although Applicants do not intend to be bound by this theory or explanation.

Figure 24:
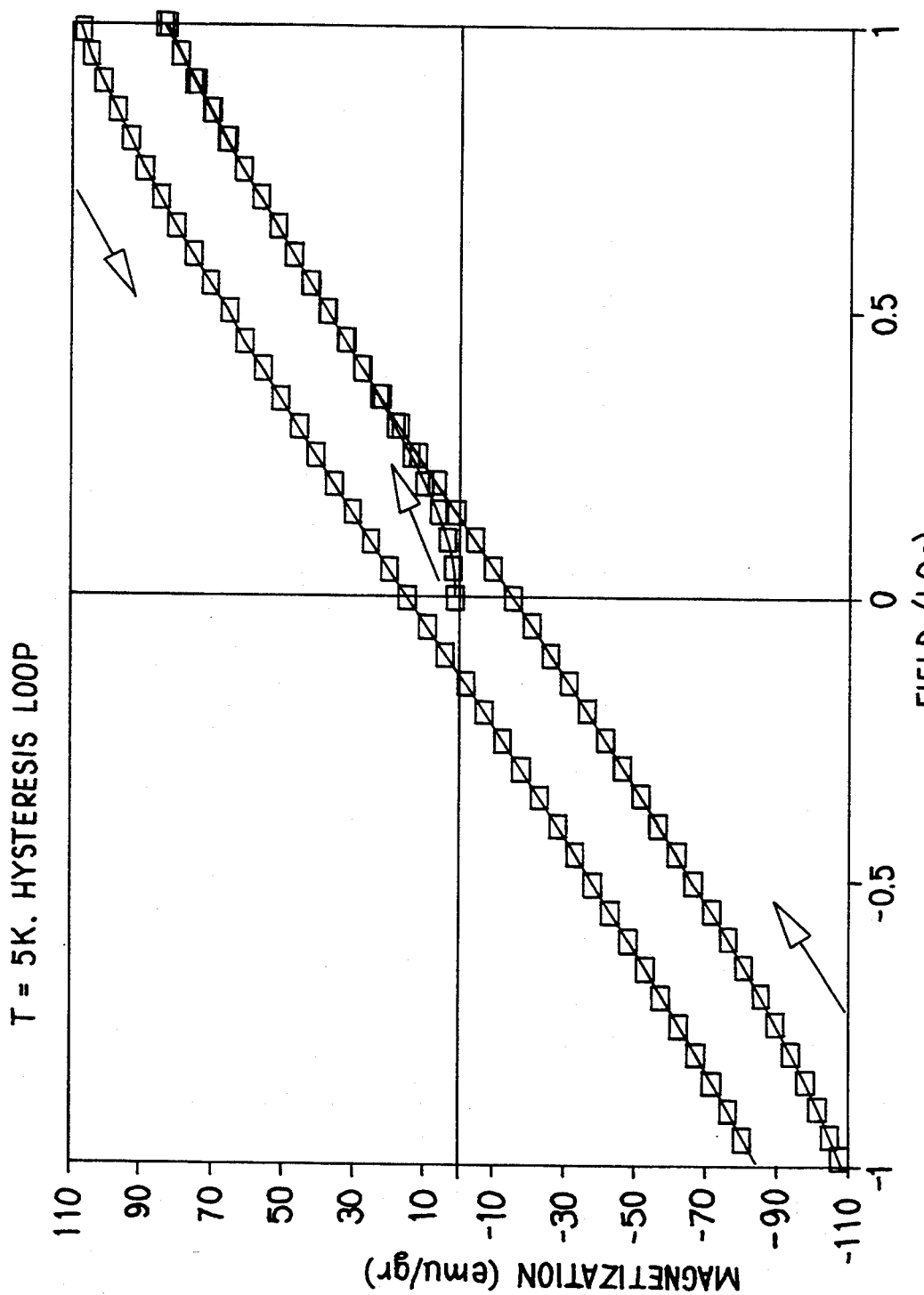
FIGS. 24 and 25 are graphs of magnetization versus field at the temperature set forth for the $(Dy_{0.55} Er_{0.45})Al_2$ alloy illustrating the low hysteresis upon magnetization/demagnetization.
Figure 25:
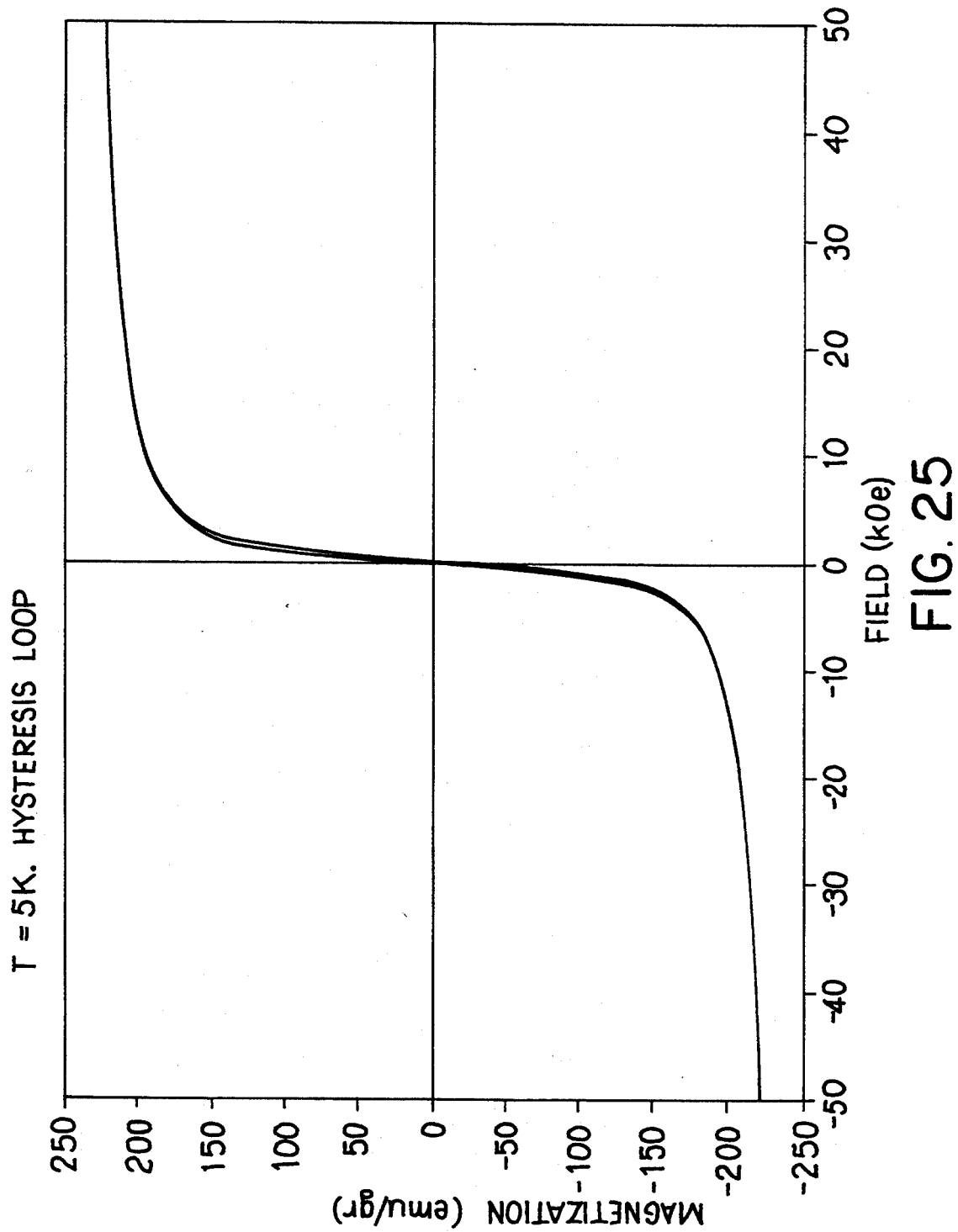

Referring to FIGS. 24–25, the $(Dy_{0.55} Er_{0.45})Al_2$ refrigerant is shown to advantageously exhibit a low hysteresis upon magnetization/demagnetization at 5° K.

It will be understood that the above description of the invention is susceptible to various modifications, changes, and adaptations, and the same are intended to be comprehended within the scope of the appended claims.

The embodiments of the invention in which an exclusive property or privilege is claimed are defined as follows:

1. A Joule-Brayton Cycle magnetic refrigerator having a single magnetic refrigerant comprising $(Dy_{1-x} Er_x)Al_2$ wherein x is greater than 0 and less than 1 operable in the temperature range of about 10 K. to about 60 K.

2. The refrigerator of claim 1 wherein the magnetic element comprises $(Dy_{0.50} Er_{0.50})Al_2$.

3. The refrigerator of claim 1 wherein the magnetic element comprises $(Dy_{0.55} Er_{0.45})Al_2$.

4. A magnetic refrigeration process using the Joule-Brayton thermodynamic cycle and a single magnetic refrigerant comprising $(Dy_{1-x}Er_x)Al_2$ wherein x is greater than 0 and less than 1 operable in the temperature range of about 10 K. to about 60 K.

5. The process of claim 4 wherein the magnetic element comprises $(Dy_{0.50} Er_{0.50})Al_2$.

6. The process of claim 4 wherein the magnetic element comprises $(Dy_{0.55} Er_{0.45})Al_2$.

* * * * *